United States Patent [19]

Sunohara et al.

[11] Patent Number: 5,596,435

[45] Date of Patent: Jan. 21, 1997

[54] LIQUID CRYSTAL DISPLAY DEVICE

[75] Inventors: Kazuyuki Sunohara; Rei Hasegawa; Hiroyuki Nagata; Takeshi Yamamoto; Yasuhiro Yamamoto; Masumi Okamoto, all of Yokohama, Japan

[73] Assignee: Kabushiki Kaisha Toshiba, Kawasaki, Japan

[21] Appl. No.: 537,440

[22] Filed: Oct. 2, 1995

Related U.S. Application Data

[63] Continuation of Ser. No. 231,039, Apr. 22, 1994, Pat. No. 5,477,360.

[30] Foreign Application Priority Data

Apr. 23, 1993 [JP] Japan ................................. 5-098028
May 13, 1993 [JP] Japan ................................. 5-111893

[51] Int. Cl.$^6$ .................... G02F 1/1337; C09K 19/00; B32B 27/00; B32B 27/06
[52] U.S. Cl. ................ 349/132; 430/20; 428/1; 428/473.5; 349/124
[58] Field of Search ................ 430/20; 359/58, 359/60, 75, 76, 78; 428/1, 473.5

[56] References Cited

U.S. PATENT DOCUMENTS

| | | | |
|---|---|---|---|
| 4,641,924 | 2/1987 | Nagae et al. ................ | 350/339 R |
| 4,914,182 | 4/1990 | Pfeifer et al. ................ | 528/353 |
| 4,958,001 | 9/1990 | Kikuchi et al. ............... | 528/346 |
| 5,064,697 | 11/1991 | Takiguchi et al. ............ | 428/1 |
| 5,094,919 | 3/1992 | Yamada et al. ............... | 428/450 |
| 5,148,300 | 9/1992 | Mizushima et al. ........... | 359/76 |
| 5,153,303 | 10/1992 | Jasne et al. ................. | 528/353 |
| 5,165,076 | 11/1992 | Tsuboyama et al. .......... | 359/75 |
| 5,223,963 | 6/1993 | Okada et al. ................. | 359/76 |
| 5,275,881 | 1/1994 | Ikeda et al. .................. | 428/332 |
| 5,280,375 | 1/1994 | Tsuda et al. ................. | 359/76 |
| 5,344,916 | 9/1994 | Harris et al. ................. | 528/353 |
| 5,436,037 | 7/1995 | Okabe et al. ................. | 428/1 |
| 5,464,668 | 11/1995 | Asaoka et al. ............... | 428/1 |
| 5,473,455 | 12/1995 | Koike et al. .................. | 359/76 |
| 5,477,360 | 12/1995 | Sunohara et al. ............ | 359/78 |

FOREIGN PATENT DOCUMENTS

| | | | |
|---|---|---|---|
| 61-205924 | 9/1986 | Japan ........................ | 359/75 |
| 62-195622 | 8/1987 | Japan ........................ | 359/76 |
| 62-267724 | 11/1987 | Japan ........................ | 430/20 |
| 63-172223 | 7/1988 | Japan ........................ | 430/20 |
| 63-231316 | 9/1988 | Japan ........................ | 359/78 |
| 5-142546 | 6/1993 | Japan ........................ | 359/75 |
| 5-265007 | 10/1993 | Japan ........................ | 359/76 |
| 5-341293 | 12/1993 | Japan ........................ | 359/78 |

OTHER PUBLICATIONS

K. H. Yang, "Two–Domain Twisted Nematic and Tilted Homeotropic LIquid Crystal Displays for Active Matrix Applications", IDRC Digest, pp. 68–72. 1991.

K. Takatori et al., "A Complementary TN LCD with Wide–Viewing–Angle Grayscale", Japan Display Proceedings, pp. 591–594. 1992.

Y. Koike et al., "Late–News Paper: A Full–Color TFT–LCD with a Domain–Divided Twisted–Nematic Structure", SID 92 Digest, pp. 798–801. 1992.

*Primary Examiner*—Glenn A. Caldarola
*Assistant Examiner*—J. Pasterczyk
*Attorney, Agent, or Firm*—Oblon, Spivak, McClelland, Maier & Neustadt, P.C.

[57] ABSTRACT

A liquid crystal display device comprising a liquid crystal cell including a pair of substrates each having an alignment film on the surface thereof, and a liquid crystal filled in a space between the substrates, which is provided with a plurality of alignment regions, each region having the direction of alignment or the rise direction of liquid crystal molecule different from another region within a display region. The alignment film comprises a polyimide having a glass transition point of 300° to 400° C., a skeleton having no two-revolution axis, non-conjugated carbon occupying 10 to 60% of the total number of carbon excluding carbon atoms directly connected to imido group, a relative dielectric constant of 4 to 7 at a frequency of 1kH and at a temperature of 20° C., or an imidization degree of not less than 90%, or a polyimide obtained by reacting tetracarboxylic acid di-anhydride with a di-amine compound, or a polyimide obtained by imidizing a polyimide, the tetracarboxylic acid di-anhydride moiety being prohibited of the free rotation thereof.

2 Claims, 5 Drawing Sheets

F I G. 13A 
F I G. 13B 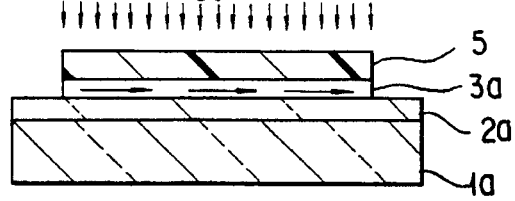
F I G. 13C 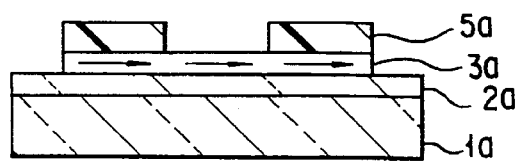
F I G. 13D 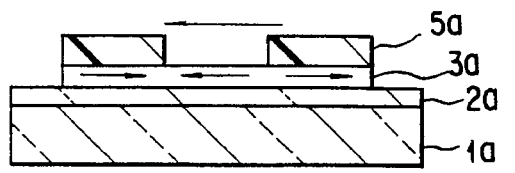
F I G. 13E 
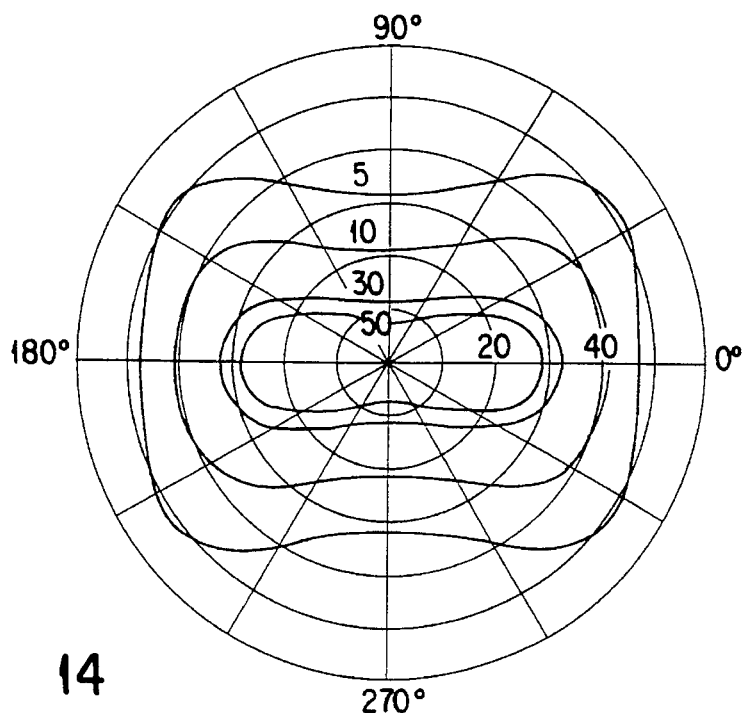
F I G. 14

LIQUID CRYSTAL DISPLAY DEVICE

This is a continuation of application Ser. No. 08/231,039 filed on Apr. 22, 1994, allowed now U.S. Pat. No. 5,477,360.

BACKGROUND OF THE INVENTION

1. Field of the Invention

This invention relates to a liquid crystal display device, and more particularly to a liquid crystal display device having a plurality of regions different in alignment from each other.

2. Description of the Related Art

A liquid crystal display device is widely utilized as a display device such as a wristwatch, an electronic calculator, and the like, since the liquid crystal display device is available as a thin device and can be operated with a low electric voltage. There are known various types of display system, such as a twisted nematic (TN) type liquid crystal display system, and a super-twisted nematic (STN) type liquid crystal display system. With the TN type liquid crystal display system, it is possible to produce a device having an excellent display characteristic which is comparable to that of CRT by incorporating therein an active switching element such as a thin film transistor (TFT). On the other hand, with the STN type liquid crystal display system, it is possible to obtain a device which is capable of high duty multiplex driving. Therefore, the both systems are now much utilized as a display for a word processor or for a personal computer.

To be more specific, a liquid crystal display device of TN type comprises a transparent substrate provided with a driving electrode, a picture element electrode and an alignment layer disposed on the surface thereof for controlling the twist angle and tilt angle of liquid crystal molecules, and a counter substrate provided with an alignment layer, which is positioned to face the above transparent substrate with a narrow space therebetween, thereby forming a liquid crystal cell. A liquid crystal composition is enclosed between these substrates, and a pair of polarizing plates are disposed as the outermost layers, the polarizing direction of each plate being formed to cross each other.

However, the TN type liquid crystal display device is defective in that since alignment directions of the liquid crystal molecules take a twisted structure in the liquid crystal cell, and its manner of rise from the substrate is accompanied with directionality, the color and contrast ratio of the display varies according to the viewing direction, i.e. they are dependent on the visual angle. Moreover, the TN type liquid crystal display device has drawbacks that the angle of visibility of the display is narrow and light utilization efficiency is poor. In particular, since the manner of rise is accompanied with directionality in the case of the TN type liquid crystal display device, there is no fundamental solution to the problem of the narrow angle of visibility.

The effect of directionality in rise of the liquid crystal molecule becomes most prominent in the display of halftone, so that the direction which causes lowering of contrast and the direction which causes color inversion are directly determined according to the direction of the rise.

To solve this problem, there is known a proposal wherein the direction of rise of liquid crystal molecules on an alignment film is varied within a picture element, thereby mutually compensating to each other any differences in angle of visibility within the planar direction, thereby making the angle of visibility wider. In other words, a method of changing the direction of rise of the liquid crystal molecule by forming a plurality of alignment films different in pre-tilt angle from each other has been proposed therein. However, when different kinds of alignment films are combined, it would give rise to the generation of a direct current component even if the device is driven by an alternating current, thereby causing a drifting phenomenon of the optimum common potential to occur in an active-matrix drive, and also giving rise to the occurrence of a defective display such as flicker and sticking.

There is another proposal to form a plurality of alignment regions, wherein the rise direction of liquid crystal molecule in each region is altered from those in other regions. According to this proposal, an alignment film is first subjected to a rubbing treatment, and then overlaid with a mask pattern through which the exposed portion of the alignment film is further subjected to rubbing treatment in a different direction from that of the previous rubbing treatment. However, this proposal is also confirmed to cause undesirable phenomena, such as the degradation of the alignment film and the lowering of alignment property, due to the influences of various materials such as a solvent contained in a masking material, the masking material itself, a developer used for patterning the mask, and a stripping liquid used for removing the mask. Moreover, there have been found other problems in this method, such as peeling or shaving of the mask due to the poor rubbing resistance found in some kind of masking materials, thus making the selection of the masking material very difficult.

SUMMARY OF THE INVENTION

The object of this invention is to provide a liquid crystal display device which is wide in effective angle of visibility, and free from fault in display performance.

The liquid crystal display device of this invention is featured in that the direction of rise of liquid crystal molecule on an alignment film is varied within a picture element, thereby mutually compensating to each other any difference in angle of visibility within the planar direction thereby making the angle of visibility wider, wherein the partitioning of the alignment region is performed by repeating a plurality of times the alignment treatment using a mask, and the material for alignment film as well as the masking material are suitably selected.

According to the first feature of this invention, there is provided a liquid crystal display device comprising a liquid crystal cell including a pair of substrates, each having an alignment film on the surface thereof, and a liquid crystal filled in a space between the substrates, wherein the alignment film has a plurality of alignment regions, each region having a direction of alignment or a rise direction of liquid crystal molecule different from another region within a display picture element, wherein the alignment film comprises a polyimide having a glass transition point of 300° to 400° C.

According to the second feature of this invention, there is provided a liquid crystal display device comprising a liquid crystal cell including a pair of substrates, each having an alignment film on the surface thereof, and a liquid crystal filled in a space between the substrates, wherein the alignment film has a plurality of alignment regions, each region having a direction of alignment or a rise direction of liquid crystal molecule different from another region within a display picture element, wherein the alignment film comprises a polyimide whose molecular skeleton is free from two-revolution symmetry axis.

According to the third feature of this invention, there is provided a liquid crystal display device comprising a liquid crystal cell including a pair of substrates, each having an alignment film on the surface thereof, and a liquid crystal filled in a space between the substrates, wherein the alignment film has a plurality of alignment regions, each region having a direction of alignment or a rise direction of liquid crystal molecule different from another region within the display picture element, wherein the alignment film comprises a polyimide whose non-conjugated carbon occupies 10 to 60% of the total number of carbon excluding carbon atoms directly connected to imido group.

According to the fourth feature of this invention, there is provided a liquid crystal display device comprising a liquid crystal cell including a pair of substrates, each having an alignment film on the surface thereof, and a liquid crystal filled in a space between substrates, wherein the alignment film has a plurality of alignment regions, each region having a direction of alignment or a rise direction of liquid crystal molecule different from another region within a display picture element, wherein the alignment film comprises a polyimide whose relative dielectric constant is 4 to 7 at a frequency of 1 kH and at a temperature of 20° C.

According to the fifth feature of this invention, there is provided a liquid crystal display device comprising a liquid crystal cell including a pair of substrates each having an alignment film on the surface thereof, and a liquid crystal filled in a space between the substrates, wherein the alignment film has a plurality of alignment regions, each region having a direction of alignment or a rise direction of liquid crystal molecule different from another region within a display picture element, wherein the alignment film comprises a polyimide which is obtained by reacting tetracarboxylic acid di-anhydride with a di-amine compound, or a polyimide which is obtained by imidizing the polymer, a tetracarboxylic acid di-anhydride moiety of the polyimide being formed so as to prohibit the free rotation thereof.

According to the sixth feature of this invention, there is provided a liquid crystal display device comprising a liquid crystal cell including a pair of substrates, each having an alignment film on the surface thereof, and a liquid crystal filled in a space between the substrates, wherein the alignment film has a plurality of alignment regions, each region having a direction of alignment or a rise direction of liquid crystal molecule different from another region within a display picture element, wherein the alignment film comprises a polyimide having an imidization degree of not less than 90%.

According to the seventh feature of this invention, there is provided a method of manufacturing a liquid crystal display device, which comprises the steps of forming an alignment film on a surface of each of a pair of liquid crystal substrates, subjecting the alignment film to an alignment treatment in a first direction, selectively covering the alignment film with a mask pattern, and subjecting exposed portions of the alignment film to an alignment treatment through the mask pattern in a second direction which is directionally different from the first direction, thereby providing a plurality of alignment regions, each region having a direction of alignment or a rise direction of liquid crystal molecule different from another region within a display picture element, the mask pattern being formed of a material comprising a photosensitive resin having a modulus in tension of 20–500 kgf/mm$^2$.

According to the eighth feature of this invention, there is provided a method of manufacturing a liquid crystal display device, which comprises the steps of forming an alignment film on a surface of each of a pair of liquid crystal substrates, subjecting the alignment film to an alignment treatment in a first direction, selectively covering the alignment film with a mask pattern, and subjecting exposed portions of the alignment film to an alignment treatment through the mask pattern in a second direction which is directionally different from the first direction, thereby providing a plurality of alignment regions, each region having a direction of alignment or a rise direction of liquid crystal molecule different from another region within a display picture element, the mask pattern being formed of a material comprising a photosensitive resin having a photosensitivity to frequency of 300 nm.

According to the ninth feature of this invention, there is provided a method of manufacturing a liquid crystal display device, which comprises the steps of forming an alignment film on a surface of each of a pair of liquid crystal substrates, subjecting the alignment film to an alignment treatment in a first direction, selectively covering the alignment film with a mask pattern, and subjecting exposed portions of the alignment film to an alignment treatment through the mask pattern in a second direction which is directionally different from the first direction, thereby providing a plurality of alignment regions, each region having a direction of alignment or a rise direction of liquid crystal molecule different from another region within a display picture element, the mask pattern being formed of a material comprising a water-soluble polymer.

According to the tenth feature of this invention, there is provided a method of manufacturing a liquid crystal display device, which comprises the steps of forming an alignment film on a surface of each of a pair of liquid crystal substrates, subjecting the alignment film to an alignment treatment in a first direction, selectively covering the alignment film with a mask pattern, and subjecting exposed portions of the alignment film to an alignment treatment through the mask pattern in a second direction which is directionally different from the first direction, thereby providing a plurality of alignment regions, each region having a direction of alignment or a rise direction of liquid crystal molecule different from another region within a display picture element, the mask pattern being formed of a material comprising a photosensitive polymer having a thermal deformation temperature of 50° C. or more.

According to the eleventh feature of this invention, there is provided a method of manufacturing a liquid crystal display device, which comprises the steps of forming an alignment film on a surface of each of a pair of liquid crystal substrates, subjecting the alignment film to an alignment treatment in a first direction, selectively covering the alignment film with a mask pattern, and subjecting exposed portions of the alignment film to an alignment treatment through the mask pattern in a second direction which is directionally different from the first direction, thereby providing a plurality of alignment regions, each region having a direction of alignment or a rise direction of liquid crystal molecule different from another region within a display picture element, the mask pattern being formed of a material comprising a photosensitive resin having a modulus of elasticity in flexure of 0.9–5.1 GPa.

According to the twelfth feature of this invention, there is provided a method of manufacturing a liquid crystal display device, which comprises the steps of forming an alignment film on a surface of each of a pair of liquid crystal substrates, subjecting the alignment film to an alignment treatment in a first direction, selectively covering the alignment film with a mask pattern, and subjecting exposed portions of the alignment film to an alignment treatment through the mask pattern in a second direction which is directionally different from the first direction, thereby providing a plurality of alignment regions, each region having a direction of alignment or a rise direction of liquid crystal molecule different from another region within a display picture element, the mask pattern being formed of a material comprising a photosensitive resin having a Rockwell hardness of not less than M50.

According to the thirteenth feature of this invention, there is provided a method of manufacturing a liquid crystal display device, which comprises the steps of forming an alignment film on a surface of each of a pair of liquid crystal substrates, subjecting the alignment film to an alignment treatment in a first direction, coating a photosensitive resin on the alignment film, performing a developing process by using a developer thereby forming a mask pattern so as to selectively cover the alignment film, subjecting exposed portions of the alignment film to an alignment treatment through the mask pattern in a second direction which is directionally different from the first direction, thereby providing a plurality of alignment regions, each region having a direction of alignment or a rise direction of liquid crystal molecule different from another region within a display picture element, and removing the mask pattern by using a stripping agent, the developer and/or stripping agent being formed of a material comprising an organic aqueous solution having a boiling point of not more than 130° C.

According to the fourteenth feature of this invention, there is provided a method of manufacturing a liquid crystal display device, which comprises the steps of forming an alignment film on a surface of each of a pair of liquid crystal substrates, subjecting the alignment film to an alignment treatment in a first direction, coating a photosensitive resin on the alignment film, performing a developing process by using a developer thereby forming a mask pattern so as to selectively cover the alignment film, removing the developer by using a rinsing liquid, subjecting exposed portions of the alignment film to an alignment treatment through the mask pattern in a second direction which is directionally different from the first direction, thereby providing a plurality of alignment regions, each region having a direction of alignment or a rise direction of liquid crystal molecule different from another region within a display picture element, and removing the mask pattern by using a stripping agent, the developer and/or stripping agent being formed of a material comprising an organic solvent having a solubility parameter of less than 8.9 $cal^{1/2} \cdot cm^{-3/2}$, or more than 10,0 $cal^{1/2} \cdot cm^{-3/2}$.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 13A to 13E are sectional views explaining the manufacturing process of a liquid crystal device representing one embodiment of this invention;

FIG. 14 is a diagram showing a uniform contrast, which was free from the dependency on the viewing angle according to one embodiment of a liquid crystal device of this invention.

DETAILED DESCRIPTION OF THE PREFERRED EMBODIMENTS

The present inventors have found after repeated researches and experiments for selecting suitable masking materials and alignment film materials that the following specific polyimide-based alignment film material and resist mask materials are found to be useful.

1. The present inventors have found after a repeated study on the resist mask materials and polyimide-based alignment film materials that there is a definite relationship between the thermal characteristic of polyimide-based alignment film materials and a solvent to be used for patterning a resist mask.

Namely, it has been found that a butadiene cyclized rubber-based resist as a negative resist, and an acrylic resist as a positive resist have been found suitable as masking materials in view of their excellent characteristics such as good patterning performance, and high resistivity to the peeling and shaving during a rubbing alignment treatment.

Since a butadiene cyclized rubber-based material and acrylic material are excellent in elasticity, it is free from the problems of peeling and shaving as mentioned above.

For the butadiene cyclized rubber-based material, alkylbenzene can be used as a solvent, and at the same time the development treatment can be performed using alkylbenzene as a developing agent. For peeling or stripping a mask, an aromatic acidic solvent such as alkylhydroxybenzene, alkylbenzene sulfonate can be used.

For the acrylic material, cellosolve series material can be used as a solvent, and the development treatment can be performed using alkali aqueous solution as a developing agent. For peeling or stripping a mask, cellosolve series material can be used.

The present inventors have found after studying various polyimides for using them as an alignment film material which is completely insoluble to and free from any influence of this kind of organic solvent, that a whole aromatic polyimide (polyimide in which the skeleton consists of aromatic groups) having a glass transition point of 450° C. is susceptible to the influence of above solvent, but a polyimide containing an aliphatic straight chain and having a glass transition point of 380° C. is hardly susceptible to the influence of above solvent.

Figure 1:
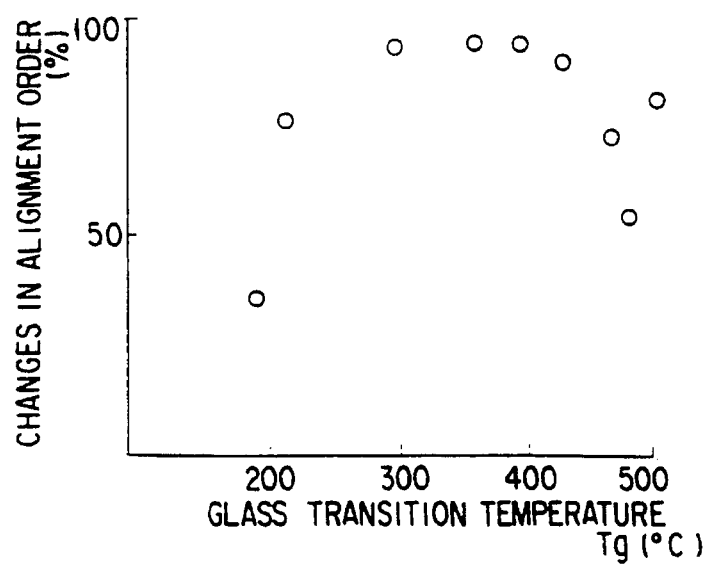
FIG. 1 is a graph showing a relationship between the glass transition temperature of a polyimide constituting an alignment film of a liquid crystal display device of this invention and changes in order parameter of alignment.

When the degree of influence by the solvent was examined in relative to the change in glass transition temperature, the results as shown in FIG. 1 were obtained. The data shown in FIG. 1 were taken by first immersing a portion of an alignment film treated in advance with rubbing as a representative example into a negative-resist-stripping agent for one hour, and then forming a liquid crystal cell into which a liquid crystal was filled, and finally measuring the ratio of order degree of alignment of an immersed portion to the order degree of alignment of non-immersed portion.

It would be clear from the data shown in FIG. 1 that a polyimide having a lower glass transition point is less susceptible to the influence of the solvent mentioned above. This phenomena can be attributed to the influence of skeletal structure of polyimide and internal structure of molded form of polyimide to its glass transition temperature. However, it has been found that when the glass transition temperature thereof is less than 300°, it will cause the lowering of the alignment stability in normal state after being kept for 100 hours at 80° C. The degree of lowering of the alignment degree of alignment after a life test in relative to the initial alignment also indicated almost the same trends as the results shown in FIG. 1.

As is clear from the above results, the structure of polyimide alignment film has an important influence to the resist mask material. In practical viewpoint, when a polyimide having a glass transition temperature of 300 to 400° C., preferably 350° to 400° C. reflecting its chemical structure is used, it is possible to perform a treatment of picture element partition alignment by repeating several times the rubbing treatment of the same alignment film using a mask without causing the degradation of alignment. Meanwhile, when a positive resist is used as a mask material, the polyimide may be applied to an organic alkali aqueous solution having a low alkali concentration.

2. The present inventors have found that there is a definite relationship between the skeleton of polyimide constituting an alignment film and a solvent to be used for patterning a resist mask.

The present inventors have found after studying various polyimides for using them as an alignment film material which is completely insoluble to and free from any influence of this kind of organic solvent, that a polyimide having a skeleton of straight chain is susceptible to the influence of above solvent, but a polyimide containing an alicyclic or an aliphatic side chain is hardly susceptible to the influence of above solvent. Namely, the influence of solvent differs according to the flexibility of the skeleton of polyimide.

The solvent to be used for the resist mentioned above is mainly of aromatic type, and low in polarity, so that when the skeleton thereof is inflexible and includes the polar groups which are not to be protruded out of the surface of the film, the solvent is easily impregnated into the chain so as to weaken the effect of the alignment treatment. In particular, a polyimide having two-revolution symmetry axis, but being soluble to the solvent contains a bulky side chain so as to be soluble to the solvent. With this kind of skeleton, the distance between the chains becomes enlarged in the chain structure of the film after being formed into a film, so that the solvent is more easily penetrated into the film, thus causing prominent degradation of alignment.

3. The present inventors have found that there is a definite relationship between the skeleton of polyimide constituting an alignment film and a solvent to be used for patterning a resist mask.

The present inventors have found, after studying various polyimides for using them as an alignment film material which are completely insoluble to and free from any influence of this kind of solvent, that a polyimide having a whole aromatic skeleton is susceptible to the influence of above solvent, and a polyimide having an alicyclic or aliphatic side chain is hardly susceptible to the influence of above solvent.

Figure 2:
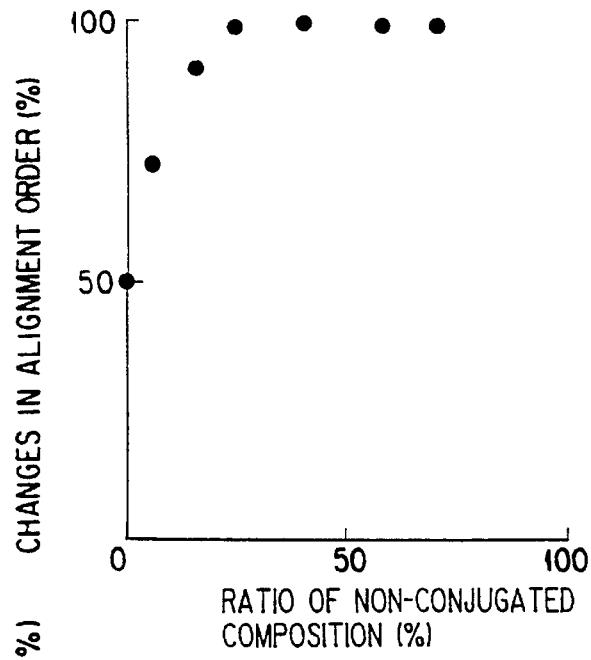
FIG. 2 is a graph showing a relationship between the ratio of non-conjugated carbon of a polyimide constituting an alignment film of a liquid crystal display device of this invention and changes in order parameter of alignment.

When the degree of the influence was investigated by changing the ratio of non-conjugated carbon to the total number of carbon except those directly connected to imido group in the skeletal structure of polyimide, the results as shown in FIG. 2 were obtained. An example of calculation representing the ratio of nonconjugated carbon to the total number of carbon when a typical polyimide the following chemical formula (1) is used is shown herein.

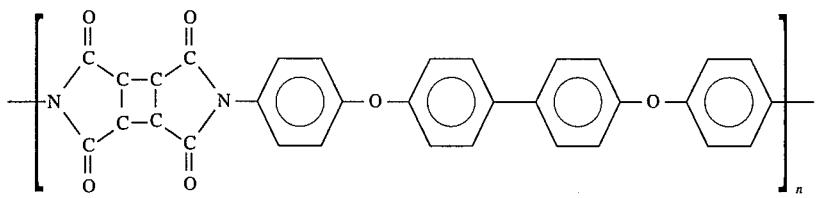

wherein n is polymerization degree.

In this polyimide having the chemical formula (1), the number of carbon having no π electron such as benzene ring and not belonging to conjugated carbon is 4 among the total number of carbon, i.e. 29 per repeating unit excepting the carbon atoms directly connected to imido group. Therefore, in this case, the ratio occupied by the non-conjugated carbon is 13.8%.

The data shown in FIG. 2 were taken by first immersing a portion of an alignment film treated in advance with rubbing into a resist-stripping agent for one hour, and then forming a liquid crystal cell into which a liquid crystal was filled, and finally measuring the ratio of order degree of alignment of an immersed portion to the order degree of alignment of non-immersed portion. As is clear from the results shown in FIG. 2, a better result could be obtained when a polyimide having a larger ratio of non-conjugated is used. However, it has been found that when this ratio is exceeded over 50%, it will cause the lowering of the alignment stability in normal state after being kept for 100 hours at 80° C. The degree of lowering of the alignment degree of alignment after a life test in relative to the initial alignment also indicated almost the same trends as the results shown in FIG. 2.

As is clear from the above results, the skeleton composition of polyimide alignment film has an important influence to the resist mask material. In practical viewpoint, when a polyimide having non-conjugated carbon occupying 10 to 60%, preferably 20 to 45% among the total number of carbon excluding the carbons directly connected to imido group is used, it is possible to perform a treatment of picture element partition alignment by repeating several times the rubbing treatment to the same alignment film by using a mask without causing the degradation of alignment.

4. The present inventors have found that there is a definite relationship between the electric characteristics of polyimide constituting an alignment film and a solvent to be used for patterning a resist mask.

The present inventors have found, after studying various polyimides for use as an alignment film material, which are completely insoluble to and free from any influence of this kind of solvent, that a whole aromatic polyimide having a relative dielectric constant of 3.5 under the conditions of 1 kHz in frequency at 20° C. is susceptible to the influence of above solvent, whereas a polyimide with an aliphatic straight chain having a relative dielectric constant of 4.2 is hardly susceptible to the influence of above solvent.

Figure 3:
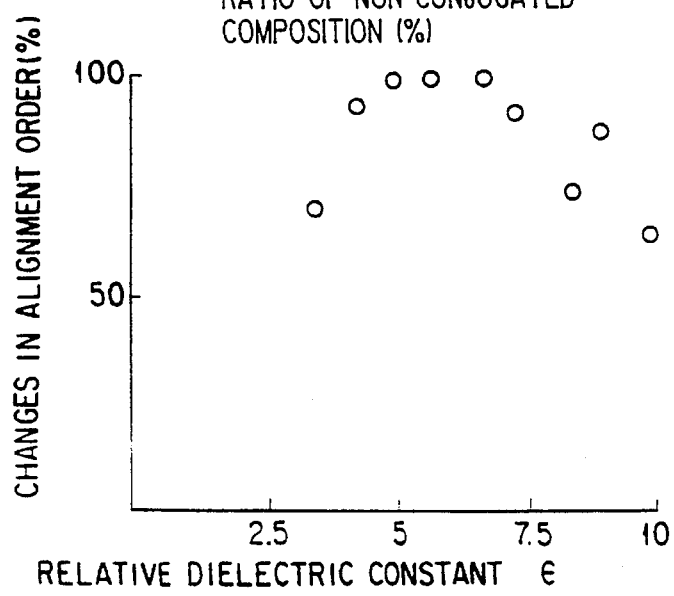
FIG. 3 is a graph showing a relationship between the relative dielectric constant of a polyimide constituting an alignment film of a liquid crystal display device of this invention and changes in order parameter of alignment.

When the degree of the influence was investigated by changing the relative dielectric constant under 1 kHz, the results as shown in FIG. 3 were obtained.

The data shown in FIG. 3 were taken by first immersing a portion of an alignment film treated in advance with rubbing into a resist-stripping agent for one hour, and then forming a liquid crystal cell into which a liquid crystal was filled, and finally measuring the ratio of order degree of alignment of an immersed portion to the order degree of alignment of non-immersed portion.

As is clear from the results shown in FIG. 3, a polyimide having a larger relative dielectric constant is less susceptible to the influence of the solvent mentioned above. These results may be attributed to the fact that the value of relative dielectric constant reflects the skeletal structure and the inner structure of a film of a polyimide. However, it has been found that when the relative dielectric constant is exceeded over 6, it will cause the lowering of the alignment stability in normal state after being kept for 100 hours at 80° C. The degree of lowering of the alignment degree of alignment after a life test in relative to the initial alignment also indicated almost the same trend as the results shown in FIG. 3.

As is clear from the above results, the structure of polyimide alignment film has an important influence to the resist mask material. In practical viewpoint, when a polyimide having a relative dielectric constant of 4 to 7, preferably 4.5 to 6.5 reflecting the structure of polyimide is used, it is possible to perform a treatment of picture element partition alignment by repeating several times the rubbing treatment to the same alignment film by using a mask without causing the degradation of alignment.

5. The present inventors have found that there is a definite relationship between the skeleton of polyimide constituting an alignment film and a solvent to be used for patterning a resist mask.

The present inventors have found, after studying various polyimides for using them as an alignment film material which is completely insoluble to and free from any influence of the solvent, developer, rinsing liquid and stripping liquid for the photoresist constituting a masking material, and the rinsing liquid to be used after stripping agent, that a polyimide which is obtained by reacting tetracarboxylic acid di-anhydride with a di-amine compound, and/or a polyimide which is obtained by imidizing the polymer obtained by reacting tetracarboxylic acid di-anhydride with a di-amine compound are susceptible to the influence of above mentioned solvent if the tetracarboxylic acid di-anhydride moiety thereof is made rotatable, but are hardly susceptible to the influence of above mentioned solvent if the tetracarboxylic acid di-anhydride moiety thereof is not made rotatable.

The examples of a polyimide having a tetracarboxylic acid di-anhydride moiety thereof, which are made fee to rotate are polyimide molecules having a single bond as shown in the following general formula (2) wherein R connected to a pair of imido groups is —CH$_2$—, —CH$_2$—CH$_2$—, —CO—, —CH$_2$—CO—CH$_2$—, —CH$_2$—COO—, CF$_2$

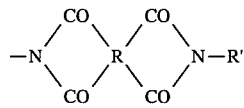

As examples of a polyimide having a tetracarboxylic acid di-anhydride moiety thereof, which are made free to rotate, the following compounds represented by the general formula (3) and (4) may be mentioned.

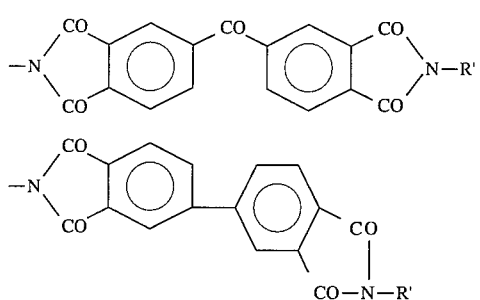
(3)

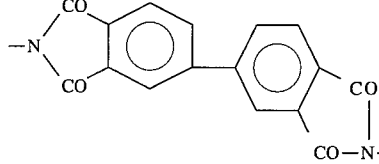
(4)

On the other hand, the examples of a polyimide having a tetracarboxylic acid di-anhydride moiety thereof, which are made unrotatable are polyimide molecules wherein R in the above general formula (2) is of cyclic structure, such as cyclobutane ring, benzene ring, cyclohexane, or includes a double bond, triple bond such as —CH=CH—,—C≡C—

As examples of a polyimide having a tetracarboxylic acid di-anhydride moiety thereof, which are made unrotatable, the following compounds represented by the general formula (5) (6) and (7) may be mentioned.

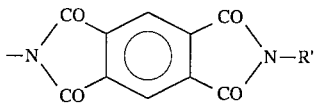
(5)

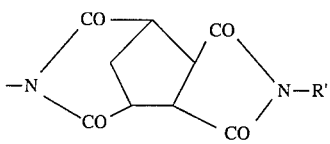
(6)

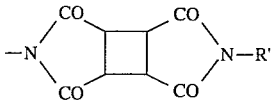
(7)

The fact that whether or not the tetracarboxylic acid di-anhydride moiety is possible to rotate has much to do with the influence of above solvent means that the degree of influence to be effected by the solvent differs according to the flexibility of the skeleton of polyimide. The reason for this difference in degree of influence by the solvent may be explained as follows.

The skeleton of polyimide whose tetracarboxylic acid di-anhydride moiety is made free to rotate is high in flexibility so that the space between polyimide molecular chains is rather wide, thereby easily allowing the solvent to be penetrated therein. When the solvent molecule is penetrated into the polyimide molecule, the space between polyimide molecular chains which have been aligned by the rubbing treatment is expanded, thereby giving rise to the relaxation (randomization) of the aligned molecule chains. When the aligned molecule chains are randomized, the effect of rubbing treatment as well as the alignment degree of the liquid crystal within a liquid crystal cell are lowered, thereby causing a defective alignment.

By contrast, in the polyimide whose tetracarboxylic acid di-anhydride moiety is made unrotatable, the space between polyimide molecular chains is rather dense (in most case, in the state of laminar structure), so that the solvent can hardly be penetrated into the polyimide molecule chains. Accordingly, the relaxation of the polyimide molecule chains would not occur, and therefore any defective alignment would not be caused.

6. The present inventors have found that there is a definite relationship between the imidization degree of polyimide constituting an alignment film and a solvent to be used for patterning a resist mask.

Polyimide alignment film is generally formed by first reacting an acid di-anhidride or the derivative thereof with a diamine usually in a non-proton type polar solvent, thereby producing a polyamide acid solution, and then the polyamide acid solution is coated on a substrate to be dehydrated and closed of its ring as indicated in the following reaction formula.

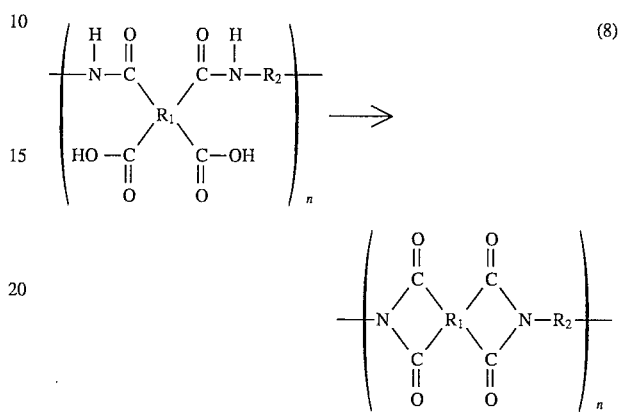
(8)

wherein $R_1$ and $R_2$ are divalent organic group, and n represents polymerization degree.

When polyamide acid moiety is existed in the polyimide alignment film due to an insufficient imidization, the N—H bond of the polyamide acid moiety tends to be transformed upon contact with an acid or an alkali. Generally, in the case of a positive resist, a developer to be used is alkaline, whereas in the case of negative resist, a developer to be used is acidic. Therefore, when a polyimide alignment film containing therein a large amount of polyamic acid moiety due to an insufficient imidization is contacted with a developer or stripping liquid, it will cause the N—H bond to react with the developer or stripping liquid, thereby inviting the denaturing of the polyamic acid moiety, and the degradation of the alignment film. As a result, the alignment of the liquid crystal becomes non-uniform, thus lowering the display quality.

The present inventors have found after studying various polyimides for use as an alignment film material, which are completely insoluble to and free from any influence of this kind of solvent, that it is possible to solve the above problems by using, as an alignment film, a polyimide having an imidization degree of not less than 90%, preferably not less than 95%.

This polyimide film is preferably made from a polyimide containing at the ratio of not less than 90% a polyimide moiety represented by the following formula (9). In this case, it is preferable to use as a masking material a negative resist comprising cyclized rubber added therewith a bisazido compound.

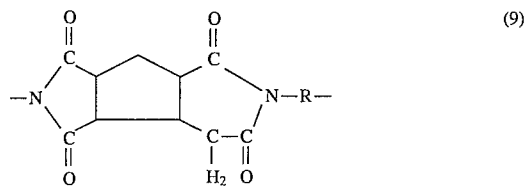
(9)

A polyimide alignment film to be employed according to this invention is generally formed by first reacting an acid di-anhydride or the derivative thereof with a diamine usually in a non-proton type polar solvent, thereby producing a polyamide acid solution, which is then dehydrated and closed of its ring. It is also possible to obtain the polyimide alignment film by reacting an acid di-anhydride or the derivative thereof with a diisocyanate usually in a non-proton type polar solvent. The polyamide film or polyimide is useful in this invention as far as the intrinsic viscosity thereof (as measured at 30° C., in dimethylformaldehyde 0.05 g/dl) is not less than 0.05 g/dl, preferably in the range of 0.05 to 5 g/dl.

Examples of acid di-anhydride or the derivative thereof to be used for obtaining the above polyimide are alicyclic tetracarboxylic acid di-anhydride or derivatives thereof such as 2,3,5-tricarboxycyclopentyl acetic acid di-anhydride, cyclobutane tetracarboxylic acid di-anhydride, cyclopentane tetracarboxylic acid di-anhydride, 5-(2,5-dioxotetrahydrofuryl)-3-methylcyclohexene dicarboxylic acid di-anhydride, bicyclo(2,2,2)-octo-7-ene-2,3,5,6-tetracarboxylic acid di-anhydride,3,5,6-tricarboxynorborane-2-acetic acid dianhydride; alicyclic tetracarboxylic acid di-anhydride or derivatives thereof such as 1,2,3,4-butane tetracarboxylic acid di-anhydride, 2,2,6,6-heptane tetracarboxylic acid di-anhydride; aromatic tetracarboxylic acid di-anhydride or derivatives thereof such as pyromellitic acid di-anhydride, 3,4,3',4'-benzophenone tetracarboxylic acid, biphenyl tetracarboxylic acid di-anhydride, naphthalene tetracarboxylic acid di-anhydride, bis(dicarboxyphenyl)propane di-anhydride, bis(dicarboxyphenyl)sulfone di-anhydride, bis(dicarboxyphenyl)ether di-anhydride, 3,4,3',4'-dimethylphenylsilane tetracarboxylic acid, perfluoroisopropylidene tetracarboxylic acid di-anhydride. These compounds may be used individually or in combination.

Among these compounds, 2,3,5-tricarboxycyclopentyl acetic acid di-anhydride, or derivatives thereof are preferable as these compounds are excellent in solubility, so that a polyimide solution which is suited for a low temperature treatment can be obtained.

Examples of diamine to be useful in this invention are aliphatic or alicyclic diamines such as ethylene diamine, propylene diamine, tetramethylene diamine, pentamethylene diamine, hexamethylene diamine, heptamethylene diamine, octamethylene diamine, nonamethylene diamine, 4,4'-dimethylheptamethylene diamine, 1,4-diaminocyclohexane, tetrahydrodicyclopentadienylene diamine, hexahydro-4,7-methanoindanylene dimethylene diamine; aromatic diamines such as 4,4'-diaminodiphenyl methane, 4,4'-diaminodiphenyl ether, 2,6-diaminotoluylene, 2,4-diaminotoluylene, paraphenylene diamine, methaphenylene diamine, paraxylene diamine, methaxylene diamine, 4,4'-diaminodiphenyl sulfone, 3,3'-diaminodiphenyl sulfone, 4,4'-diaminodiphenyl sulfide, 4,4'-diaminobenzophenone, 2,6-diaminonaphthalene, 1,5-diaminonaphthalene, 4,4'-diaminodiphenyl, 3,3'-dimethyl-4,4'-diaminophenyl methane, 3,3'-dicarboxy-4,4'-diaminodiphenyl methane, and 3,3'-dimethyl-4,4'-diaminodiphenyl methane; and diaminoorganosiloxane represented by the following general formula (10). These compounds may be used individually or in combination.

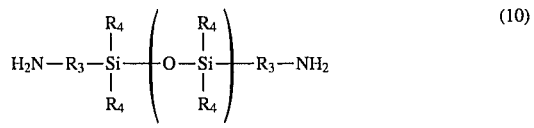
(10)

wherein $R_3$ is methylene group containing 1 to 50 carbon atoms, phenyl ring, or cyclohexane ring; $R_4$ is alkylene group containing 1 to 20 carbon atoms, phenyl group, or cyclohexyl group; and m is an integer of 1 to 100.

As a diisocyanate, a diamine whose amino group is substituted by isocyanate group can be used.

As a reaction solvent to be used for the reaction between the above acid dianhydride or the derivative thereof and diamine or diisocyanate, non-protonic polar solvent such as dimethyl amide, dimethyl acetoamide, dimethyl sulfoxide, hexamethyl phosphoric amide, N-methyl-2-pyrrolidone, tetramethyl urea, or gammabutyrolactone may be used individually or in combination. It is also possible to mix an ordinary organic solvent such as alcohol, ketone, ester, or hydrocarbon into the above reaction solvent.

Since the polyimide to be used in this invention has an imidization degree of not less than 90%, the amount of N—H bond existing in the polyamide acid moiety is few, so that it is possible to inhibit the degradation of the surface of the alignment film during the developing and stripping processes of a resist material. The imidization degree is herein defined as the ratio of polyimide (II) component to the total amount of polyamide acid (I) component and polyimide (II) component, or the ratio of polyimide (II) component to the whole components. This imidization degree can be easily determined by for example measuring a change in infrared absorption spectrum of carbonyl group of imido ring of polyimide (II), which is generated as the polyamide acid (I) is dehydrated and transformed into a closed ring.

As a method of increasing the imidization degree up to over 90%, either a method of employing an organic solvent-soluble polyimide, or the conventional method of thermally or chemically dehydrating a coated layer of polyamic acid to form a ring closure thereby transforming it into polyimide can be adopted. An N—H bond of polyamic acid moiety existing in the aligned layer of polyimide film tends to react through an acid-salt reaction with alkylbenzenesulfonic acid constituting acidic component of the resist stripping solution. As a result, the alignment layer of a polyimide film containing polyamic acid component is badly affected, causing the disturbance of the main chain constituting the alignment film aligned in advance by the rubbing direction, thereby making the alignment of the liquid crystal ununiform.

However, according to this invention, the alignment layer of a polyimide film contains the polyamic acid component as little as less than 10%, it is possible to prevent the quality of display of a liquid crystal device from being degraded during the process of the development or stripping of the resist material. As a result, it is possible to obtain a high quality display device having a uniform angle of visibility even if it is viewed from any direction.

According to this invention, a polyimide containing not less than 90% of polyimide moiety represented by the general formula (8) is preferably employed as a polyimide film. This polyimide is excellent in solubility, so that it can be easily dissolved in the state of polyimide into an organic solvent such as gammabutyrolactone, thereby forming a stable solution. Therefore, this polyimide can be easily coated over a substrate to be formed into a completely imidized polyimide film on the substrate by heating it at such a relatively low temperature of 180° C. that would not destroy other members such as a color filter.

When a negative resist comprising a cyclized rubber added with a bisazido compound is used as a resist in the alignment treatment of polyimide film having an imidization degree of not less than 90%, it is possible to easily form such a fine pattern of several microns. This is due to the fact that the negative resist comprising a cyclized rubber added with a bisazido compound is highly sensitive to the irradiation of ultraviolet ray so as to cause the cross-linking reaction of the resist. Moreover, since this resist is as hard as the polyimide film, the problems such as the scratching of the surface of the alignment film by the peeled or removed pieces from the surface of the resist during the rubbing alignment treatment or the spoiling of the clean room by the peeled or removed pieces from the resist can be avoided.

Even though either of a negative photoresist or a positive photoresist may be used, it is preferable to use the negative photoresist. When a positive photoresist is to be employed, it is preferable to use an acryl-based positive photoresist as explained below.

In the manufacture of semiconductor device, a novolak resin is widely utilized as a base resin of a positive resist. However, since the novolak resin is poor in elasticity, the use of novolak type positive resist would cause the generation of peeled or removed products from the surface of the resist during the second rubbing treatment, thereby giving rise to the scratching of the surface of the aligned film, or a defective display resulting from the dust (peeled products).

By contrast, when a positive resist comprising acryl resin as a base resin is used, the generation of peeled or removed products from the surface of the resist can be avoided, and an excellent result as obtainable in the case of butadiene cyclized rubber-based negative resist would be obtained. The reason for this can be explained that the acryl resin is rather elastic as compared with the novolak resin, and is excellent in adhesivity to the under layer of polyimide alignment film.

When an acryl-based positive resist of chemically magnified type which is highly sensitive is employed among others, it is possible to obtain a fine pattern of submicron. This chemically magnified resist is a mixture comprising a base resin such as acryl resin or polymethacrylate, an acid-generating agent such as onium salt, nitrobenzene ester, or sulfonate, and a solubility inhibiting agent such as acetal compound, polyphthal aldehyde, cylyl ether polymer, aliphatic acid ester or methoxymethyl melamine.

As mentioned hereinabove, when a polyimide having an imidization degree of not less than 90% is employed as an alignment film, an excellent result can be obtained. However, it is also possible to employ a polyimide having an imidization degree of less than 90%, provided that a positive resist is to be employed. When a polyimide having an imidization degree of less than 90% is employed, problems such as deterioration of display quality resulting from peeled or removed products from the surface of the positive resist can be avoided as explained below.

It has been found that in the process of forming a positive resist pattern by means of picture element partition alignment treatment, an alkaline developing agent is contacted with the surface of the alignment film, thereby causing the denaturing of the surface of the alignment film, and lowering the pretilt angle of a liquid crystal molecule. However, when a polyimide having an imidization degree of less than 90% is employed, the polyamic acid included in the alignment film functions to raise the pretilt angle, thereby allowing a suitable pretilt angle (2° to 10°) to be obtained. As a result, it is possible to obtain a high quality display device being excellent in liquid crystal alignment, and having a uniform angle of visibility even if it is viewed from any direction.

In this case, a cresol novolak-based or acrylic positive resist can be employed as a resist material. This resist is highly sensitive to a UV ray having a frequency of 365 nm or 406 nm, and allows a fine pattern of several microns to be formed.

7. The present inventors have found after various experiments that a mask material having a modulus in tension of 20 to 500 kgf/mm$^2$, preferably 100 to 400 kg/mm$^2$ is suitably employed to obtain an excellent result.

In view of requirements for the patterning process, a photoresist material, in particular a cresol novolak-based positive resist which has been widely used can be employed. This resist contains a sensitizing agent whose structure is transformed upon the irradiation of UV ray so as to cause the cresol novolak-based positive resist to show the inherent solubility of the cresol novolak. Accordingly, the molecular weight thereof is controlled so as to be easily dissolved into water.

Phenol resin-based resist is featured in that it is fragile, and poor in mechanical shock. Generally, a hard resin is low in elasticity modulus, and do not have a yield point from which a plastic deformation is initiated. When a rubbing treatment is conducted on this resist, the portions to which fibers of cloth have been contacted are liable to be shaved thereby generating shavings. The shavings thus generated not only become a cause of dusty materials, but also adhere to the rubbing cloth thereby spoiling the substrate and extremely lowering the effects of the rubbing treatment.

Accordingly, it is required for a masking material to have a predetermined elasticity. It has been found by the present inventors after great deal of study on various high molecular materials that when a material having a modulus of elasticity in tension of not less than 20 kgf/mm$^2$ is employed, the phenomena of peeling and shaving of the film can be avoided as shown in the following Table 1. As for the influence to the alignment of the masking material, it has been found that when a material having a modulus of elasticity in tension of more than 500 kgf/mm$^2$ is employed, it gives rise to not only the blur of an alignment pattern due to the deformation of the mask, but also a lot of the mask being left unremoved.

TABLE 1

| Mask Materials | Modulus of Elasticity in Tenson (kqf/mm$^2$) | Peeling. Shaving | Blur of Pattern |
|---|---|---|---|
| Cured Rubber | 100 | None | None |
| Nylon 66 | 220 | None | None |
| Nylon 6 | 120 | None | None |
| Polystyrene | 300 | None | None |
| PVA | 150 | None | None |
| Polyurethane | 600 | None | Admitted |
| Polyethylene | 850 | None | Admitted |
| Phenol | 8 | Admitted | None |
| Polyester | 15 | Admitted | None |

Therefore, it has been confirmed that, by using, as a masking material, a material having a modulus of elasticity in tension ranging from 20 to 500 kgf/mm$^2$, it is possible to perform a patterning of a resist without causing the lowering of the effects of alignment treatment, thereby realizing in an industrial scale the partition alignment of picture elements.

8. The present inventors have found after various experiments that a mask material having a photosensitivity to wave-length of not less than 300 nm can be suitably employed to obtain an excellent result. As is well known, the selection of masking materials is very difficult, as some of masking materials are found to be poor in rubbing resistance so that it give rise to the problems such as peeling and shaving of mask. In view of these problems, the present inventor have conducted the study on various materials to find that some kinds of conditions, which are not expected up to date, are required for the masking material to be useful as explained below.

Since the masking material is used for partitioning the alignment region, a patterning thereof is required. In this case, in order to realize a precise patterning in micron order, it is most preferable to employ a photoresist in the patterning process. In this patterning process, an electromagnetic wave of short wavelength of such as i beam, g beam, electron beam, exma laser beam or X-ray is irradiated onto the photoresist through a photomask. It has been found in this case that when a beam having a wavelength shorter than that of the g beam, or a beam having a wavelength of less than 300 nm is irradiated onto an alignment film processed in advance with a rubbing alignment treatment, the effect of the alignment treatment performed in advance is decreased according to the magnitude of the irradiation dose.

Figure 4:
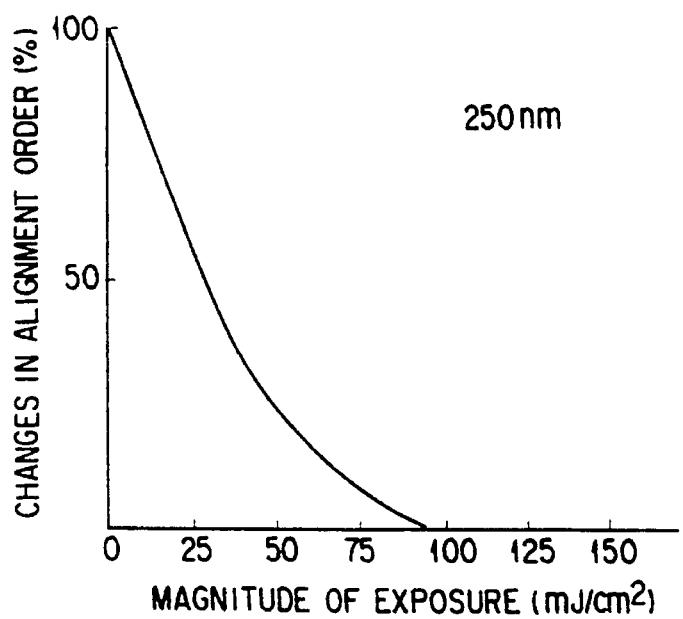
FIG. 4 is a graph showing a relationship between the magnitude of exposure of an alignment film of a liquid crystal device of this invention to ultraviolet light and changes in order parameter of alignment.
Figure 5:
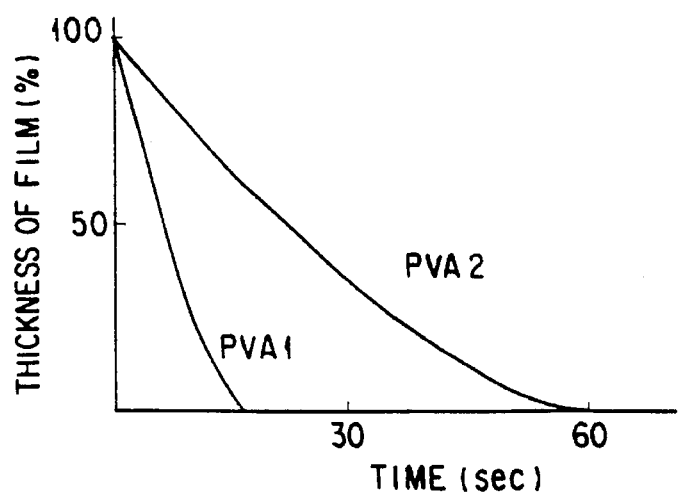
FIG. 5 is a graph showing the solubility of PVA constituting the masking material employed in the manufacture of a liquid crystal device of this invention.

FIG. 4 indicates changes in the order degree of the alignment, wherein the liquid crystal cell was produced by first rubbing the alignment film of a thermally ring-closed polyimide, and then irradiating a beam 250–300 nm in wavelength onto the aligned film by changing the irradiation dose. These changes in the order degree of the alignment can be said to be a phenomenon that can be brought about when a portion of the skeleton of the alignment film is cut off upon absorption therein of the beam of this range of wave-length. The beam having a wave-length of 250 nm has an energy of 114 kcal/mol, which is sufficient for cutting the ordinary carbon-carbon bond. Therefore, when the resist itself is employed as a rubbing mask, or even when the photoresist is employed for patterning the masking material, the use of a beam having a wave-length of less than 300 nm is not desirable.

Therefore, it has been realized by using, as a masking material, a material having a photosensitivity to wave-length of not less than 300 nm to perform a patterning of a resist without lowering the effects of alignment treatment, thereby realizing the partition alignment of picture elements.

9. The present inventors have found after various experiments that when a water-soluble polymer is employed as a mask material, it is possible to obtain an excellent result.

Namely, it has been confirmed by the present inventors that a water-soluble polymer such as polyvinyl alcohol is useful as a mask material which is excellent in rubbing resistance, and does not give a bad influence to the alignment film made of for example polyimide. With the use of a water-soluble polymer, it is possible to perform the patterning and stripping of the resist without requiring a solvent which may dissolve the alignment film material, such as polyimide. The water-soluble polymer also has a sufficient rubbing resistance to be used as a masking material for an alignment film.

However, since the water-soluble polymer such as polyvinyl alcohol itself is not suited for being formed into a pattern, it is required to utilize a photoresist for forming a pattern. It has been confirmed that when a photoresist material to be developed with a positive or negative strong alkaline aqueous solution is used, the patterned portion is dissolved due to the use of the aqueous polymer during the development process, thereby allowing the alkaline developer to directly contact with the alignment film to degrade the quality of alignment of the alignment film. Therefore, it is required for the water-soluble polymer such as polyvinyl alcohol to be used as a mask for the alignment film to adjust the water-solubility thereof so as not to allow the alkaline developer to contact with the alignment film.

It has been confirmed by the present inventors after repeated studies that the water-solubility of polyvinyl alcohol can be adjusted by adjusting the saponification degree, the polymerization degree and sintering temperature of the polyvinyl alcohol. To be more specific, a polyvinyl alcohol (PVA2) having 90% or more in saponification degree, 1000 or more in polymerization degree and 120° C. or more in sintering temperature is found to be suitable as being low in water-solubility under the room temperature. By the way, PVA1 is a polyvinyl alcohol which does not meet the above conditions.

These conditions are required for the polyvinyl alcohol in the development using an alkaline aqueous solution. It has become possible by the use of an aqueous polymer meeting these conditions to perform a repeated alignment treatment, by masking the alignment portion without considering the selection of an alignment film material.

Since an alignment film is exposed to a solvent having a high solubility under a high temperature, during the stripping process of a resist in subsequent to the second alignment treatment, the use of a negative resist may become a cause of the deterioration of alignment. However, when a resist material is formed over a water-soluble polymer, the portion of water-soluble polymer would be easily dissolved upon immersing the substrate into a hot water, thus allowing the resist portion to be easily stripped off. Therefore, it has become possible to use all kinds of resist by disposing thereon a water-soluble polymer layer.

The alignment film to be used in this case may be the one which comprises a water-insoluble polymer film, whose surface has been subjected to an alignment treatment by means of for example rubbing treatment, or the one comprising a rhombic evaporated layer of an inorganic material such as SiO. As the water-insoluble polymer, polyimide, polyamide, polyamideimide, polysulfone, polyester, polybenzoimidasol, polyether, polysulfide, polybenzoimidazopyrroline, polyphenyl, polynaphthalene, polycyanoacetone, polyacrylonitrile, polystyrene, or polyaniline may be employed.

10. The present inventors have found after various experiments that when a photosensitive resin having a thermal deformation temperature of 50° C. or more, preferably 130° C. or more is employed as a mask material, it is possible to obtain an excellent result.

It has been found by the present inventors upon examining an ethylene-base positive resist comprising polyethylene having a photosensitive group bonded thereto, the resist is liable to be denatured and deformed during the rubbing treatment. It has been further found that the deformation of the resist is brought about by the thermal disintegration of part of the resist due to the generation of a frictional heat between the rubbing cloth and the resist during the rubbing treatment.

When the resist is deformed, it is no more possible to precisely partition the alignment region for obtaining a plurality of alignment regions, wherein each region has a different rising direction of a liquid crystal molecule from that of other regions. Moreover, the disintegrated portion of the resist resulted from the frictional heat may cause the contamination of a clean room, or adhere to a rubbing cloth to lower the effect of rubbing treatment. Therefore, it is required for the masking material to have a suitable heat resistance.

Figure 6:
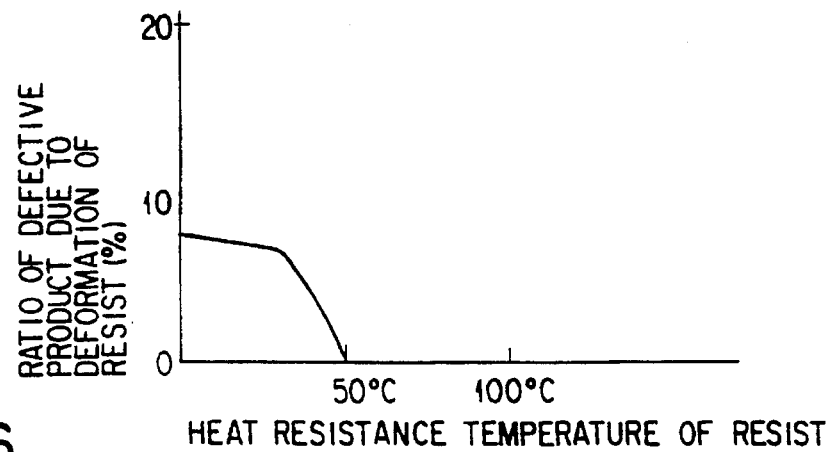
FIG. 6 is a graph showing a relationship between the heat resistance temperature of a photoresist constituting the masking material employed in the manufacture of a liquid crystal device of this invention and the ratio of occurrence of defective product due to the deformation of the photoresist.
Figure 7:
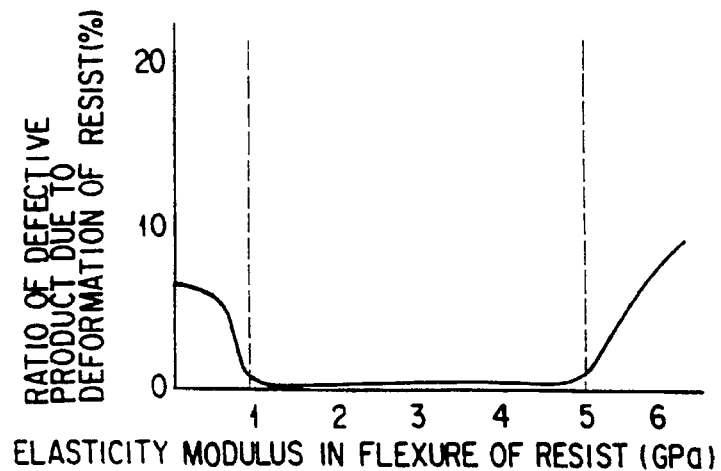
FIG. 7 is a graph showing a relationship between the modulus of elasticity in flexure of a photoresist constituting the masking material employed in the manufacture of a liquid crystal device of this invention and the ratio of occurrence of defective product due to the deformation of the photoresist.
Figure 8:
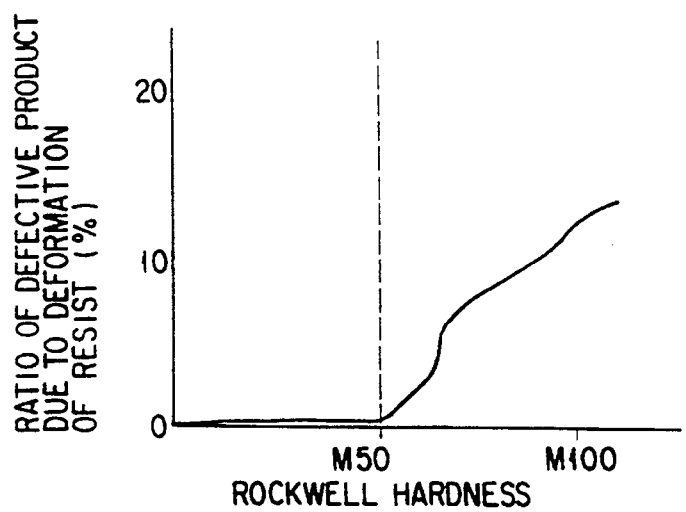
FIG. 8 is a graph showing a relationship between the Rockwell hardness of a photoresist constituting the masking material employed in the manufacture of a liquid crystal device of this invention and the ratio of occurrence of defective product due to the deformation of the photoresist.
Figure 9:
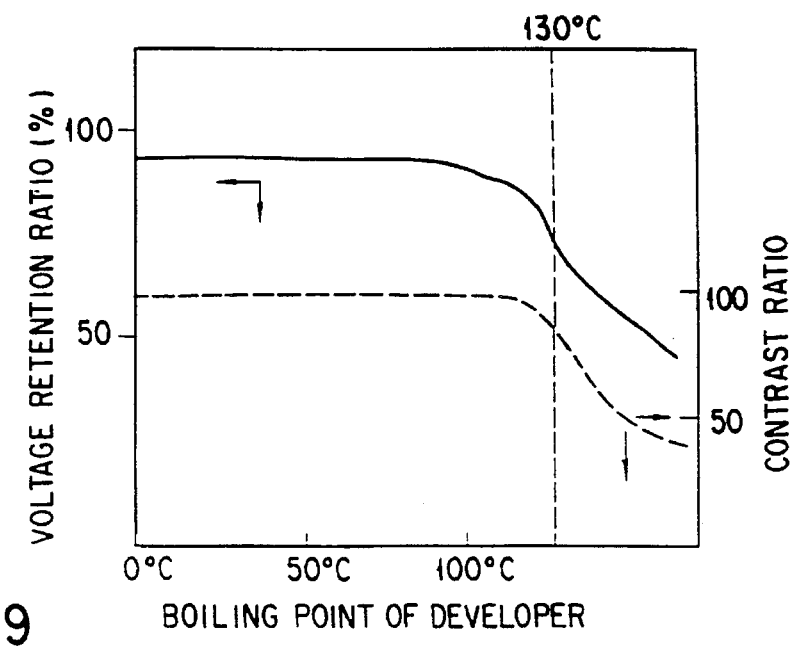
FIG. 9 is a graph showing a relationship between the boiling point of an organic material constituting the developer employed in the manufacture of a liquid crystal device of this invention and a voltage-retaining rate.

It has been found by the present inventors upon examining various polymers that when a polymer having a heat resistance of 50° C. or more is used, the deformation of the resist during the rubbing treatment can be avoided as shown in FIG. 6.

Thus, with the use of photosensitive resins having a thermal transformation temperature of 50° C. or more, preferably 130° C. or more, it is possible to perform the patterning of the photosensitive resin layer without spoiling the effects of the alignment, and to obtain a precise partition of picture element.

11. The present inventors have found after various experiments that a mask material comprising a photosensitive resin having a modulus of elasticity in flexure of 0.9 to 5.1 GPa, preferably 2.0 to 4.0 GPa is employed, it is possible to obtain an excellent result.

In view of requirement for the patterning, a photoresist material, in particular a cresol novolak-based positive resist has been widely used. When this cresol novolak-based positive resist was utilized by the present inventors, it was found that part of the resist was shaved during the rubbing treatment, thereby producing shavings. The shavings thus produced not only become a cause of contamination of the clean room, but also adhere to the rubbing cloth thereby spoiling the substrate and extremely lowering the effects of the rubbing treatment. This cresol novolak-based positive resist belongs to phenol resin, and therefore is fragile and poor in resistance to mechanical shock just like phenol resin. Accordingly, it is required for a masking material to have a predetermined elasticity.

It has been found by the present inventors after great deal of study on various high molecular materials that when a material having a modulus of elasticity in flexure of not more than 5.1 GPa is employed, the phenomena of peeling and shaving of the film can be avoided as shown in the following Table 7. On the hand, when a material having a modulus of elasticity in flexure of 0.9 GPa is employed, it gives rise to not only the deformation of the mask thereby making it impossible to perform a precise partition of the alignment region, but also a lot of the mask being left unremoved.

Thus, with the use of a photosensitive resin having a modulus of elasticity in flexure of 0.9 to 5.1 GPa as a masking material, it is possible to perform the patterning of the photosensitive resin layer without spoiling the effects of the alignment, and to obtain a precise partition of picture element.

12. The present inventors have found after various experiments on the masking materials that a mask material comprising a photosensitive resin having a Rockwell hardness of M50 or more, preferably M70 or more is employed, it is possible to obtain an excellent result.

When a cresol novolak-based positive resist was utilized as a mask by the present inventors, it was found that part of the resist was shaved during the rubbing treatment, thereby producing shavings. The shavings thus produced not only become a cause of contamination of the clean room, but also adhere to the rubbing cloth thereby spoiling the substrate and extremely lowering the effects of the rubbing treatment. Accordingly, it is required for a masking material to have a predetermined elasticity.

It has been found by the present inventors after great deal of study on various high molecular materials that when a photosensitive resin having a Rockwell hardness of M50 or more is employed, the phenomena of peeling and shaving of the film can be avoided as shown in the following Table 8.

Thus, with the use of a photosensitive resin having a Rockwell hardness of M50 or more as a masking material, it is possible to perform the patterning of the photosensitive resin layer without spoiling the effects of the alignment, and to obtain a precise partition of picture element.

13. The present inventors have found, after various experiments on the physical properties of developer (or developing solution) and stripping agent (or stripping solution) which do not dissolve in any extent an alignment film comprising polyimide, and do not give any bad influence to the alignment film, that an organic solution having a boiling point of not more than 130° C., in particular an alkaline solution has been found to be useful as it does not badly affect the alignment of a liquid crystal or the performance of the cell.

By contrast, when an organic solution having a boiling point exceeding 130° C. is employed as a developer or as a stripping agent, the developer or the stripping agent which is sticked on the surface of the alignment film hardly evaporates, thus covering the surface of the alignment film, and becomes an impurity left remained within the liquid crystal cell, thereby deteriorating the performance of the liquid crystal cell, in particular lowering the voltage retention constant.

When an organic solution having a boiling point of not more than 130° C., preferably not more than 120° C. is employed as a developer and/or as a stripping agent, the organic solution is left remained in a very little amount within the alignment film comprising polyimide, and this little amount of the organic solution functions to increase the pretilt angle of the liquid crystal molecule. As a result, the speed of response is improved, i.e. unexpected effects has been admitted.

It is preferable in this case to use a developer having a hydrogen ion concentration of $10^{-11.5}$ or more, i.e. 11.5 or less in pH.

Figure 10:
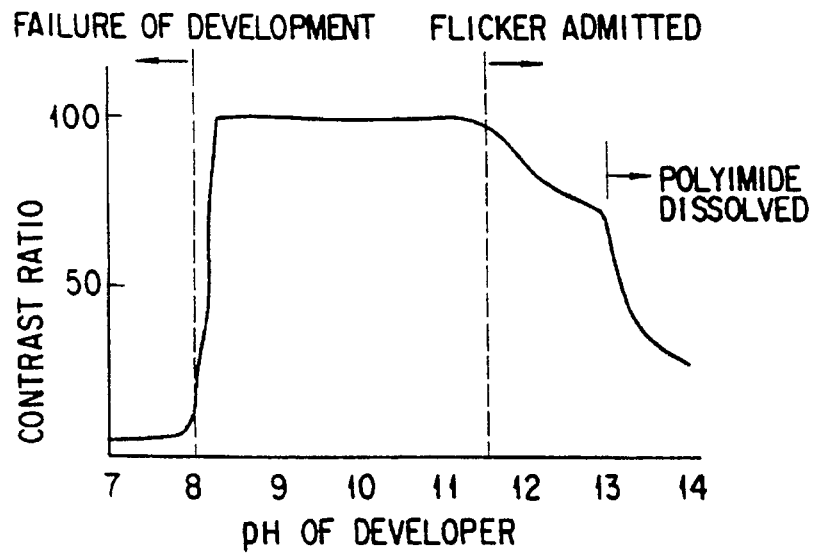
FIG. 10 is a graph showing a relationship between the pH of a developer employed in the manufacture of a liquid crystal device of this invention and a contrast ratio.

As shown in FIG. 10, when a strong alkaline developing solution more than 11.5 in pH is employed, the polyimide alignment film would be alkali-hydrolyzed. As a result, the remaining DC component during the operation of a liquid crystal device is left as an electrical charge in the film to cause an alteration of electric voltage applied to the liquid crystal, thereby inviting the lowering of contrast or the generation of flicker.

Since pH is influenced by carbon dioxide in air, it is advisable in producing a developing solution 11.5 in pH to prepare a developer having an acid dissociation constant of 10.1 or less and to make it into an aqueous solution.

Figure 11:
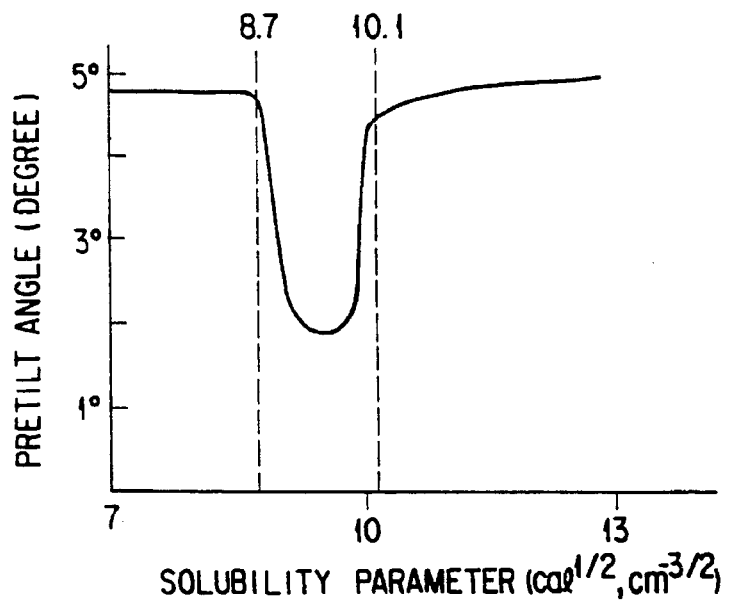
FIG. 11 is a graph showing a relationship between the solubility parameter of a developer employed in the manufacture of a liquid crystal device of this invention and a pretilt angle of a liquid crystal molecule.

14. The present inventors have conducted an experiment wherein a polyimide substrate treated in advance with rubbing was immersed into various organic solutions to be employed for a rinsing solution or a stripping solution, and then assembled into a liquid crystal cell, thereby to investigate the performances of the liquid crystal cell. As a result, it has been found that there is a relationship between the solubility parameter of an organic solvent and the pretilt angle as shown in FIG. 11. It would be clear from FIG. 11 that when the solubility parameter is in the range of 8.7 to 10.0 $cal^{1/2} \cdot cm^{-3/2}$, the pretilt angle of the liquid crystal molecule is lowered. This phenomenon can be explained as that since the solubility parameter of the organic solvent is very close to that of polyimide, the surface of polyimide treated in advance with rubbing is dissolved or swelled, thereby changing the status of polyimide (unevenness or orientation degree of molecule). Accordingly, it is preferable to employ a solvent having the solubility parameter of less than 8.7, preferably less than 7.0 $cal^{1/2} \cdot cm^{-3/2}$, or over 10.0 $cal^{1/2} \cdot cm^{-3/2}$, a developer, a stripping agent, and a rinsing agent. By using a solvent having this range of solubility parameter, any change in pretilt angle due to the penetration of a solvent can be avoided, and the generation of edge reverse can be minimized.

As a display system using the liquid crystal device of this invention, all of the display systems in which the angle of visibility is restricted by the difference in direction from the rising direction of the liquid crystal molecule under an electric field-induced state, such as twisted nematic display, STN, SBE, and ECB can be applicable.

It is also possible to incorporate an active switch element such as TFT into the liquid crystal display device of this invention so as to obtain an excellent display.

Figure 12:
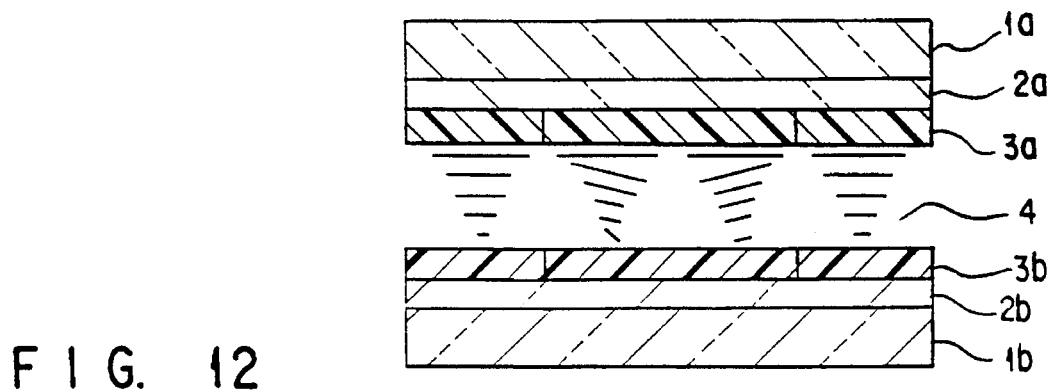
FIG. 12 is a sectional view of a liquid crystal device representing one embodiment of this invention.

FIG. 12 represents a sectional view of 90° TN type liquid crystal display device according to one embodiment of this invention.

In FIG. 12, a pair of transparent electrodes 2a and 2b are formed respectively on a pair of transparent substrates 1a and 1b disposed face to face. On these transparent electrodes 2a and 2b are formed a pair of alignment films 3a and 3b respectively. A liquid crystal 4 is filled in a space between the pair of alignment films 3a and 3b. The liquid crystal molecules of the liquid crystal 4 are aligned in such a manner that they are twisted by 90° from the state on the surface of the alignment film 3a, which is in parallel with the surface of the drawing to the state on the surface of the alignment film 3b, which is perpendicular to the surface of the drawing.

FIGS. 13A to FIG. 13E are sectional views indicating the steps of alignment treatment of the substrate of the liquid crystal display device according to this invention. In these FIGS. the alignment treatment only one of the substrates, i.e. the substrate 1a is shown. However, the same process as indicated in these FIGS. can also be applied to the other substrate 1b.

As shown in FIG. 13A, the transparent electrode 2a and the alignment film 3a are formed on the surface of the glass substrate 1a, and then a first rubbing treatment in the direction of the arrow is performed on the entire surface of the alignment film 3a. Thereafter, a photoresist 5 is coated all over the surface of the alignment film 3a as shown in FIG. 13B, and then selectively irradiated with light and developed thereby forming a photoresist pattern 5a as shown in FIG. 13C.

Subsequently, a second rubbing treatment in a direction which differs by 180° from that of the first rubbing treatment, i.e. in the opposite direction to that of the first rubbing treatment is performed. Then the photoresist pattern 5a is stripped off, thereby obtaining, as shown in FIG. 13E, a liquid crystal substrate having in one picture element a plurality of regions, each of which differs by 180° in alignment direction from the other region.

This invention will be further explained with reference to the following examples and comparative examples thereby showing in detail the effects of this invention.

In the following Examples 1 and 2, polyimide having a glass transition point of 300° to 400° C. was employed as an alignment film material, and a negative photoresist was employed as a masking material.

EXAMPLE 1

A thermal ring-closure type polyimide having a glass transition temperature of 400° C. was coated over the surface of each of transparent substrates, each being provided in advance with a transparent electrode. Each of the substrates was post-baked at a temperature of 280° C. for one hour, thereby fixing an alignment film comprising polyimide on the surface of the substrate, and then a first rubbing treatment was performed.

After forming a negative photoresist layer (OMR-85, Tokyo Ohka Kogyo Co. Ltd.) of 10000 Å in thickness on the surface of the alignment film, a half of the region of one picture element was irradiated with light, and developed with a predetermined developing liquid, thereby patterning the photoresist to form a mask covering a half of the picture element. Thereafter, a second rubbing treatment in the direction opposite to the first rubbing direction was performed to the exposed alignment film, and then the layer of the mask was removed by using a predetermined stripping liquid.

The pair of the substrates thus obtained were assembled into a 90° TN by facing the second rubbing treatment portions thereof to each other. Then, Np (nametic phase) liquid crystal was filled in the space between the pair of the substrates, thereby forming a liquid crystal display cell having an inter-electrode distance of 6 μm. The liquid crystal display cell thus obtained showed an excellent alignment state at the initial state, and at the same time indicated an excellent display which was free from inversion of brightness and darkness according to the difference in viewing angle in the half tone display.

EXAMPLE 2

TFT switch elements were mounted on one of a pair of transparent substrate, and picture element electrodes of 200 μm square and made of a transparent electrode were formed on the wiring in the form of matrix. Further, a supplemental capacity line was formed at the center of the picture element. Meanwhile, on all over the surface of the other one of the substrates was formed a black matrix so as to correspond to the transparent electrode and to the wiring.

Then, a solvent-soluble ring-closure type polyimide having a glass transition temperature of 380° C. was coated over the surface of each of transparent substrates. Each of the substrate was post-baked at a temperature of 180° C. for one hour, thereby fixing an alignment film comprising polyimide on the surface of the substrate, and then a first rubbing treatment was performed.

After forming a negative photoresist layer (OMR-85, Tokyo Ohka Kogyo Co. Ltd.) 8000 Å in thickness on the surface of the alignment film, a half of the region of one picture element, i.e. a region encircled by a gate line, a signal line and a supplemental capacity line was irradiated with light, and developed with a predetermined developing liquid, thereby patterning the photoresist to form a mask covering a half of the picture element.

Thereafter, a second rubbing treatment in the direction opposite to the first rubbing direction was conducted, and then the layer of the mask was removed by using a predetermined stripping liquid.

The pair of the substrates thus obtained were assembled into a 90° TN by facing the mask portions thereof to each other, and at the same time facing the second rubbing treatment portions thereof to each other. Then, Np liquid crystal was filled into the space between the pair of the substrates, thereby forming a liquid crystal display cell having an inter-electrode distance of 6 μm. The liquid crystal display cell thus obtained showed an excellent alignment state at the initial state, and at the same time indicated an excellent display which was free from inversion of brightness and darkness according to the difference in viewing angle in the half tone display, and also free from a tilt discrination line.

In the following Examples 3 and 4, polyimide having a glass transition point of 300° to 400° C. was employed as an alignment film material, and a positive photoresist was employed as a masking material.

EXAMPLE 3

The process of Example 1 was repeated except that an acryl positive photoresist (ARC-1, Nihon Gosei Gomu Co.

Ltd.) was employed as a masking material, and NMD-3 (0.5% by weight) was used as a developing liquid.

The liquid crystal display cell thus obtained showed an excellent alignment state at the initial state, and at the same time indicated an excellent display which was free from inversion of brightness and darkness according to the difference in viewing angle in the half tone display.

EXAMPLE 4

The process of Example 2 was repeated except that an acryl positive photoresist (ARC-1, Nihon Gosei Gomu Co. Ltd.) was employed as a masking material, and dimethylethanol amine (1.5% by weight) was used as a developing liquid.

The liquid crystal display cell thus obtained showed an excellent alignment state at the initial state, and at the same time indicated an excellent display which was free from inversion of brightness and darkness according to the difference in viewing angle in the half tone display, and also free from a tilt discrination line.

Comparative Example 1

TFT switch elements were mounted on one of a pair of transparent substrate, and picture element electrode of 200 μm square and made of a transparent electrode were formed on the wiring in the form of matrix. Further, a supplemental capacity line was formed at the center of the picture element. Meanwhile, on all over the surface of the other one of the substrates was formed a black matrix so as to correspond to the transparent electrode and to the wiring.

Then, a solvent-soluble ring-closure type polyimide having a glass transition temperature of 250° C. was coated over the surface of each of transparent substrates. Each of the substrates post-baked at a temperature of 180° C. for one hour, thereby fixing an alignment film comprising polyimide on the surface of the substrate, and then a first rubbing treatment was performed.

After forming a negative photoresist layer (OMR-85, Tokyo Ohka Kogyo Co. Ltd.) 8000 Å in thickness on the surface of the alignment film, a half of the region of one picture element, i.e. a region encircled by a gate line, a signal line and a supplemental capacity line was irradiated with light, and developed with a predetermined developing liquid, thereby patterning the photoresist to form a mask covering a half of the picture element.

Thereafter, a second rubbing treatment in the direction opposite to the first rubbing direction was conducted, and then the layer of the mask was removed by using a predetermined stripping liquid.

The pair of the substrates thus obtained were assembled into a 90° TN by facing the mask portions thereof to each other, and at the same time facing the second rubbing treatment portions thereof to each other. Then, Np liquid crystal was filled into the space between the pair of the substrates, thereby forming a liquid crystal display cell having an inter-electrode distance of 6 μm. The liquid crystal display cell thus obtained showed an excellent alignment state at the initial state, but a conspicuous deterioration in alignment was admitted after 50 hours of life test at a temperature of 100° C.

Comparative Example 2

A whole aromatic ring-closure type polyimide having a glass transition temperature of 420° C. was coated over the surface of each of transparent substrates, each being provided in advance with a transparent electrode. Each of the substrates was post-baked at a temperature of 280° C. for one hour, thereby fixing an alignment film comprising polyimide on the surface of the substrate, and then a first rubbing treatment was performed.

After forming a negative photoresist layer (OMR-85, Tokyo Ohka Kogyo Co. Ltd.) 10000 Å in thickness on the surface of the alignment film, a half of the region of one picture element was irradiated with light, and developed with a predetermined developing liquid, thereby patterning the photoresist.

Thereafter, a second rubbing treatment in the direction opposite to the first rubbing direction was conducted, and then the layer of the mask was removed at a temperature of 80° C. by using a predetermined stripping liquid.

The pair of the substrates thus obtained were assembled into a 90° TN by facing the mask portions thereof to each other, and at the same time facing the second rubbing treatment portions thereof to each other. Then, Np liquid crystal was filled into the space between the pair of the substrates, thereby forming a liquid crystal display cell having an inter-electrode distance of 6 μm. The liquid crystal display cell thus obtained showed a clear trace of the pouring flow of liquid crystal at the initial state, due to the influence from the resist-stripping liquid to the alignment film, and at the same time indicated a defective display, thereby making it impossible to partition the picture element into two regions having a different rising direction of the liquid crystal molecule from each other that can be induced by the writing through electric voltage.

In the following Examples 5 to 8, polyimide having no two-revolution symmetric axis in its skeleton was employed as an alignment film material, and a negative photoresist was employed as a masking material.

EXAMPLE 5

A thermal ring-closure type polyimide represented by the following general formula (11) was coated over the surface of each of transparent substrates, each being provided in advance with a transparent electrode. This polyimide had no two-revolution symmetrical axis in its skeleton.

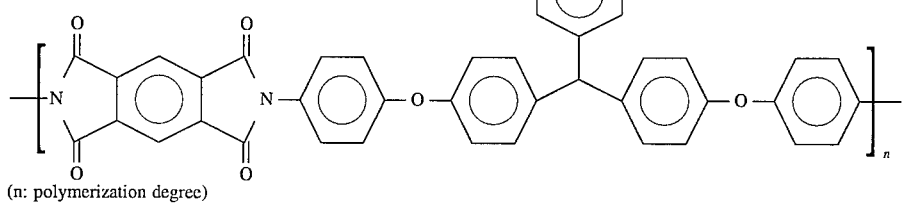

(n: polymerization degree)

(11)

Each of the substrates was post-baked at a temperature of 280° C. for one hour, thereby fixing an alignment film comprising polyimide on the surface of the substrate, and then a first rubbing treatment was performed.

After forming a negative photoresist layer (OMR-85, Tokyo Ohka Kogyo Co. Ltd.) 10000 Å in thickness on the surface of the alignment film, a half of the region of one picture element was irradiated with light, and developed with a predetermined developing liquid, thereby patterning the photoresist to form a mask covering a half of the picture element. Thereafter, a second rubbing treatment in the direction opposite to the first rubbing direction was conducted, and then the layer of the mask was removed by using a predetermined stripping liquid. In this manufacturing process, the alignment film was not dissolved into the solvent for the developing liquid, and found after an oblique lighting test as being normal.

The pair of the substrates thus obtained were assembled into a 90° TN by facing the mask portions thereof to each other, and at the same time facing the second rubbing treatment portions thereof to each other. Then, Np liquid crystal was filled into the space between the pair of the substrates, thereby forming a liquid crystal display cell having an inter-electrode distance of 6 μm. The liquid crystal display cell thus obtained showed an excellent alignment state at the initial state, and at the same time indicated an excellent display which was free from inversion of brightness and darkness according to the difference in viewing angle in the half tone display.

EXAMPLE 6

TFT switch elements were mounted on one of a pair of transparent substrate, and picture element electrodes of 200 μm square and made of a transparent electrode were formed on the wiring in the form of matrix. Further, a supplemental capacity line was formed at the center of the picture element. Meanwhile, on all over the surface of the other one of the substrates was formed a black matrix so as to correspond to the transparent electrode and to the wiring.

Then, a solvent-soluble ring-closure type polyimide having the following general formula (12) was coated over the surface of each of transparent substrates. This polyimide contained no two-revolution symmetrical axis in its skeleton.

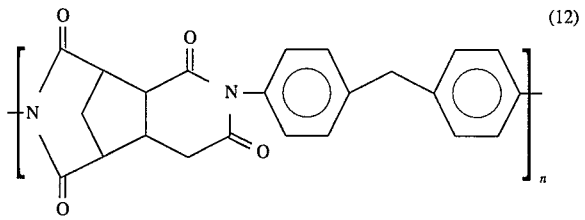
(12)

Each of the substrates was post-baked at a temperature of 180° C. for one hour, thereby fixing an alignment film comprising polyimide on the surface of the substrate, and then a first rubbing treatment was performed.

After forming a negative photoresist layer (OMR-85, Tokyo Ohka Kogyo Co. Ltd.) 8000 Å in thickness on the surface of the alignment film, a half of the region of one picture element, i.e. a region encircled by a gate line, a signal line and a supplemental capacity line was irradiated with light, and developed with a predetermined developing liquid, thereby patterning the photoresist to form a mask covering a half of the picture element.

Thereafter, a second rubbing treatment in the direction opposite to the first rubbing direction was conducted, and then the layer of the mask was removed by using a predetermined stripping liquid.

The pair of the substrates thus obtained were assembled into a 90° TN by facing the mask portions thereof to each other, and at the same time facing the second rubbing treatment portions thereof to each other. Then, Np liquid crystal was filled into the space between the pair of the substrates, thereby forming a liquid crystal display cell having an inter-electrode distance of 6 μm. The liquid crystal display cell thus obtained showed an excellent alignment state at the initial state, and at the same time indicated an excellent display which was free from inversion of brightness and darkness according to the difference in viewing angle in the half tone display, and also free from a tilt discrination line.

EXAMPLE 7

A solvent-soluble ring-closure type polyimide having the following general formula (13) was coated over the surface of a pair of the same transparent substrate as that used in Example 4, and the same processes as those of Example 4 were repeated. The liquid crystal display cell thus obtained showed an excellent alignment state at the initial state, and at the same time indicated an excellent display which was free from inversion of brightness and darkness according to the difference in viewing angle in the half tone display, and also free from a tilt disclination line.

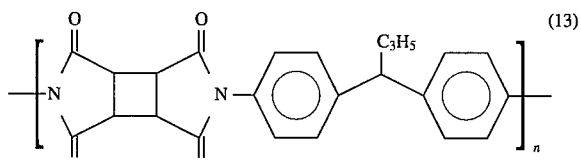
(13)

EXAMPLE 8

A solvent-soluble ring-closure type polyimide having the following general formula (14) was coated over the surface of a pair of the same transparent substrate as that used in Example 2, and the same processes as those of Example 2 were repeated. The liquid crystal display cell thus obtained showed an excellent alignment state at the initial state, and at the same time indicated an excellent display which was free from inversion of brightness and darkness according to the difference in viewing angle in the half tone display, and also free from a tilt discrination line.

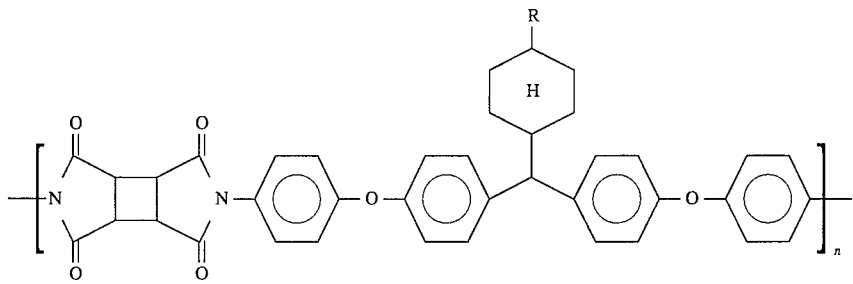

(14)

In the following Examples 9 to 12, polyimide having no two-revolution symmetric axis in its skeleton was employed as an alignment film material, and a positive photoresist was employed as a masking material.

EXAMPLE 9

The process of Example 5 was repeated except that an acryl positive photoresist (ARC-1, Nihon Gosei Gomu Co. Ltd.) was employed as a masking material, and NMD-3 (0.5% by weight) was used as a developing liquid.

The liquid crystal display cell thus obtained showed an excellent alignment state at the initial state, and at the same time indicated an excellent display which was free from inversion of brightness and darkness according to the difference in viewing angle in the half tone display.

EXAMPLE 10

The process of Example 6 was repeated except that an acryl positive photoresist (ARC-1, Nihon Gosei Gomu Co. Ltd.) was employed as a masking material, and dimethylethanol amine (0.5% by weight) was used as a developing liquid.

The liquid crystal display cell thus obtained showed an excellent alignment state at the initial state, and at the same time indicated an excellent display which was free from inversion of brightness and darkness according to the difference in viewing angle in the half tone display, and also free from a tilt disclination line.

EXAMPLE 11

The process of Example 7 was repeated except that an acryl positive photoresist (ARC-1, Nihon Gosei Gomu CO. Ltd.) was employed as a masking material, and NMD-3 (0.5% by weight) was used as a developing liquid.

The liquid crystal display cell thus obtained showed an excellent alignment state at the initial state, and at the same time indicated an excellent display which was free from inversion of brightness and darkness according to the difference in viewing angle in the half tone display, and also free from a tilt disclination line.

EXAMPLE 12

The process of Example 8 was repeated except that an acryl positive photoresist (ARC-1, Nihon Gosei Gomu Co. Ltd.) was employed as a masking material, and NMD-3 (0.5% by weight) was used as a developing liquid.

The liquid crystal display cell thus obtained showed an excellent alignment state at the initial state, and at the same time indicated an excellent display which was free from inversion of brightness and darkness according to the difference in viewing angle in the half tone display, and also free from a tilt disclination line.

Comparative Example 3

TFT switch elements were mounted on one of a pair of transparent substrate, and picture element electrodes of 200 μm square and made of a transparent electrode were formed on the wiring in the form of matrix. Further, a supplemental capacity line was formed at the center of the picture element. Meanwhile, on all over the surface of the other one of the substrates was formed a black matrix so as to correspond to the transparent electrode and to the wiring.

Then, a solvent-soluble ring-closure type polyimide having the following general formula (15) was coated over the surface of each of transparent substrates.

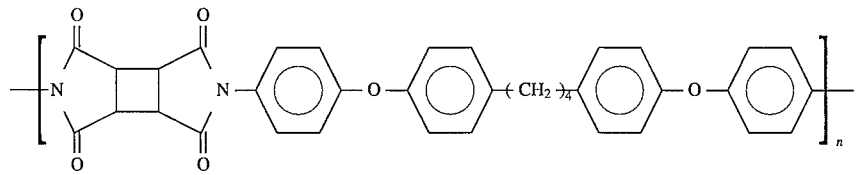

(15)

Each of the substrates was post-baked at a temperature of 180° C. for one hour, thereby fixing an alignment film comprising polyimide on the surface of the substrate, and then a first rubbing treatment was performed.

After forming a negative photoresist layer (OMR-85, Tokyo Ohka Kogyo Co. Ltd.) 8000 Å in thickness on the surface of the alignment film, a half of the region of one picture element, i.e. a region encircled by a gate line, a signal line and a supplemental capacity line was irradiated with light, and developed with a predetermined developing liquid, thereby patterning the photoresist to form a mask covering a half of the picture element.

Thereafter, a second rubbing treatment in the direction opposite to the first rubbing direction was conducted, and then the layer of the mask was removed by using a predetermined stripping liquid.

In this manufacturing process, when the display of the alignment film was tested by using an oblique light after the stripping process, there was admitted on the whole surface of the film a trace of the flow of the solvent.

The pair of the substrates thus obtained were assembled into a 90° TN by facing the mask portions thereof to each other, and at the same time facing the second rubbing treatment portions thereof to each other. Then, Np liquid crystal is filled into the space between the pair of the substrates, thereby forming a liquid crystal display cell having an inter-electrode distance of 6 µm. The liquid crystal display cell thus obtained did not show a TN alignment state at the initial state, and was incapable of conducting a picture element partition treatment.

Comparative Example 4

The process of Comparative Example 1 was repeated except that a solvent-soluble ring closure type polyimide as shown in the following general formula (16) was coated on the same substrate as that used in the Comparative Example 1, and the same treatments as those in the Comparative Example 1 were conducted. The liquid crystal display cell thus obtained did not show a TN alignment state at the initial state, and was incapable of conducting a picture element partition treatment.

The pair of the substrates thus obtained were assembled into a 90° TN by facing the mask portions thereof to each other, and at the same time facing the second rubbing treatment portions thereof to each other. Then, Np liquid crystal was filled into the space between the pair of the substrates, thereby forming a liquid crystal display cell having an inter-electrode distance of 6 µm. The liquid crystal display cell thus obtained showed a clear trace of the pouring flow of liquid crystal at the initial state, due to the influence from the resist-stripping liquid to the alignment film, and at the same time indicated a defective display, thereby making it impossible to partition the picture element into two regions having a different rising direction of the liquid crystal molecule from each other that can be induced by the writing through electric voltage.

In the following Examples 13 and 14, polyimide having non-conjugated carbon in its skeleton, the number of the non-conjugated carbon occupying 10 to 60% of the total number of carbon excluding those directly connected to imido group was used as an alignment film material, and a negative photoresist was employed as a masking material.

EXAMPLE 13

A thermal ring-closure type polyimide having non-conjugated carbon in its skeleton, the number of the non-

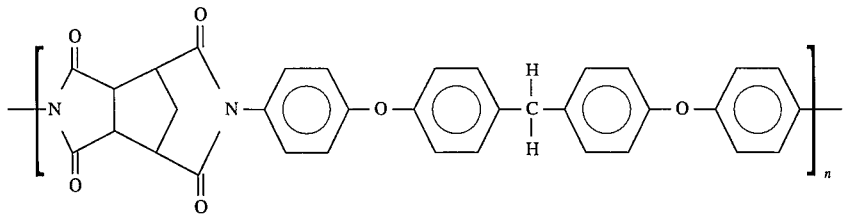

(16)

Comparative Example 5

A whole aromatic ring-closure type polyimide having the following general formula (17) was coated over the surface of each of transparent substrates, each being provided in advance with a transparent electrode. This polyimide contained along the longitudinal axis thereof two-revolution symmetrical axis in its skeleton. The resultant device was post-baked at a temperature of 250° C. for one hour, thereby fixing an alignment film comprising polyimide on the surface of the substrate, and then a first rubbing treatment was performed.

After forming a negative photoresist layer (OMR-85, Tokyo Ohka Kogyo Co. Ltd.) 10000 Å in thickness on the surface of the alignment film, a half of the region of one picture element was irradiated with light, and developed with a predetermined developing liquid, thereby patterning the photoresist.

conjugated carbon occupying 13.8% of the total number of carbon excluding those directly connected to imido group was coated over the surface of each of transparent substrates, each being provided in advance with a transparent electrode. Each of the substrates was post-baked at a temperature of 280° C. for one hour, thereby fixing an alignment film comprising polyimide on the surface of the substrate, and then a first rubbing treatment was performed.

After forming a negative photoresist layer (OMR-85, Tokyo Ohka Kogyo Co. Ltd.) 10000 Å in thickness on the surface of the alignment film, a half of the region of one picture element was irradiated with light, and developed with a predetermined developing liquid, thereby patterning the photoresist to form a mask covering a half of the picture element. Thereafter, a second rubbing treatment in the direction opposite to the first rubbing direction was conducted, and then the layer of the mask was removed by using a predetermined stripping liquid.

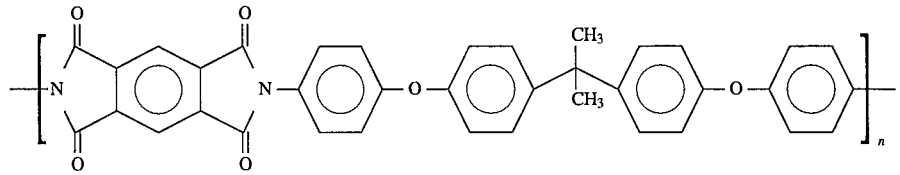

(17)

Thereafter, a second rubbing treatment in the direction opposite to the first rubbing direction was conducted, and then the layer of the mask was removed at a temperature of 80° C. by using a predetermined stripping liquid.

The pair of the substrates thus obtained were assembled into a 90° TN by facing the mask portions thereof to each other, and at the same time facing the second rubbing treatment portions thereof to each other. Then, Np liquid crystal was filled into the space between the pair of the substrates, thereby forming a liquid crystal display cell having an inter-electrode distance of 6 μm. The liquid crystal display cell thus obtained showed an excellent alignment state at the initial state, and at the same time indicated an excellent display which was free from inversion of brightness and darkness according to the difference in viewing angle in the half tone display.

EXAMPLE 14

TFT switch elements were mounted on one of a pair of transparent substrate, and picture element electrode of 200 μm square and made of a transparent electrode were formed on the wiring in the form of matrix. Further, a supplemental capacity line was formed at the center of the picture element. Meanwhile, on all over the surface of the other one of the substrates was formed a black matrix so as to correspond to the transparent electrode and to the wiring.

Then, a solvent-soluble ring-closure type polyimide having 33.3% in number of non-conjugated carbon was coated over the surface of each of transparent substrates. Each of the substrates was post-baked at a temperature of 180° C. for one hour, thereby fixing an alignment film comprising polyimide on the surface of the substrate, and then a first rubbing treatment was performed.

After forming a negative photoresist layer (OMR-85, Tokyo Ohka Kogyo Co. Ltd.) 8000 Å in thickness on the surface of the alignment film, a half of the region of one picture element, i.e. a region encircled by a gate line, a signal line and a supplemental capacity line was irradiated with light, and developed with a predetermined developing liquid, thereby patterning the photoresist to form a mask covering a half of the picture element.

Thereafter, a second rubbing treatment in the direction opposite to the first rubbing direction was conducted, and then the layer of the mask was removed by using a predetermined stripping liquid.

The pair of the substrates thus obtained were assembled into a 90° TN by facing the mask portions thereof to each other, and at the same time facing the second rubbing treatment portions thereof to each other. Then, Np liquid crystal was filled into the space between the pair of the substrates, thereby forming a liquid crystal display cell having an inter-electrode distance of 6 μm. The liquid crystal display cell thus obtained showed an excellent alignment state at the initial state, and at the same time indicated an excellent display which was free from inversion of brightness and darkness according to the difference in viewing angle in the half tone display, and also free from a tilt disclination line.

In the following Examples 15 and 16, polyimide having non-conjugated carbon in its skeleton, the number of the non-conjugated carbon occupying 10 to 60% of the total number of carbon excluding those directly connected to imido group was used as an alignment film material, and a positive photoresist was employed as a masking material.

EXAMPLE 15

The process of Example 13 was repeated except that an acryl positive photoresist (ARC-1, Nihon Gosei Gomu Co. Ltd.) was employed as a masking material, and NMD-3 (0.5% by weight) was used as a developing liquid.

The liquid crystal display cell thus obtained showed an excellent alignment state at the initial state, and at the same time indicated an excellent display which was free from inversion of brightness and darkness according to the difference in viewing angle in the half tone display.

EXAMPLE 16

The process of Example 14 was repeated except that an acryl positive photoresist (ARC-1, Nihon Gosei Gomu Co. Ltd.) was employed as a masking material, and NMD-3 (0.5% by weight) was used as a developing liquid.

The liquid crystal display cell thus obtained showed an excellent alignment state at the initial state, and at the same time indicated an excellent display which was free from inversion of brightness and darkness according to the difference in viewing angle in the half tone display, and also free from a tilt disclination line.

Comparative Example 6

TFT switch elements were mounted on one of a pair of transparent substrate, and picture element electrodes of 200 μm square and made of a transparent electrode were formed on the wiring in the form of matrix. Further, a supplemental capacity line was formed at the center of the picture element. Meanwhile, on all over the surface of the other one of the substrates was formed a black matrix so as to correspond to the transparent electrode and to the wiring.

Then, a solvent-soluble ring-closure type polyimide having 66.7% in number of non-conjugated carbon was coated over the surface of each of transparent substrates. Each of the substrate was post-baked at a temperature of 180° C. for one hour, thereby fixing an alignment film comprising polyimide on the surface of the substrate, and then a first rubbing treatment was performed.

After forming a negative photoresist layer (OMR-85, Tokyo Ohka Kogyo Co. Ltd.) 8000 Å in thickness on the surface of the alignment film, a half of the region of one picture element, i.e. a region encircled by a gate wiring, a signal wiring and a supplemental capacity wiring was irradiated with light, and developed with a predetermined developing liquid, thereby patterning the photoresist to form a mask covering a half of the picture element.

Thereafter, a second rubbing treatment in the direction opposite to the first rubbing direction was conducted, and then the layer of the mask was removed by using a predetermined stripping liquid.

The pair of the substrates thus obtained were assembled into a 90° TN by facing the mask portions thereof to each other, and at the same time facing the second rubbing treatment portions thereof to each other. Then, Np liquid crystal was filled into the space between the pair of the substrates, thereby forming a liquid crystal display cell having an inter-electrode distance of 6 μm. The liquid crystal display cell thus obtained showed an excellent alignment state at the initial state, but a conspicuous deterioration in alignment was admitted after 50 hours of life test at a temperature of 100° C.

Comparative Example 7

A whole aromatic ring-closure type polyimide was coated over the surface of each of transparent substrates, each being provided in advance with a transparent electrode. Each of the substrates was post-baked at a temperature of 280° C. for one hour, thereby fixing an alignment film comprising polyimide on the surface of the substrate, and then a first rubbing treatment was performed.

After forming a negative photoresist layer (OMR-85, Tokyo Ohka Kogyo Co. Ltd.) 10000 Å in thickness on the surface of the alignment film, a half of the region of one picture element was irradiated with light, and developed with a predetermined developing liquid, thereby patterning the photoresist.

Thereafter, a second rubbing treatment in the direction opposite to the first rubbing direction was conducted, and then the layer of the mask was removed at a temperature of 80° C. by using a predetermined stripping liquid.

The pair of the substrates thus obtained were assembled into a 90° TN by facing the mask portions thereof to each other, and at the same time facing the second rubbing treatment portions thereof to each other. Then, Np liquid crystal was filled into the space between the pair of the substrates, thereby forming a liquid crystal display cell having an inter-electrode distance of 6 μm. The liquid crystal display cell thus obtained showed a clear trace of the pouring flow of liquid crystal at the initial state, due to the influence from the resist-stripping liquid to the alignment film, and at the same time indicated a defective display, thereby making it impossible to partition the picture element into two regions having a different rising direction of the liquid crystal molecule from each other that can be induced by the writing through electric voltage.

In the following Examples 17 and 18, polyimide having a relative dielectric constant of 4 or more in the frequency of 1 kHz at 20° C. was employed as an alignment film material, and a negative photoresist was employed as a masking material.

EXAMPLE 17

A thermal ring-closure type polyimide having a relative dielectric constant of 4 was coated over the surface of each of transparent substrates, each being provided in advance with a transparent electrode. Each of the substrates was post-baked at a temperature of 280° C. for one hour, thereby fixing an alignment film comprising polyimide on the surface of the substrate, and then a first rubbing treatment was performed.

After forming a negative photoresist layer (OMR-85, Tokyo Ohka Kogyo Co. Ltd.) 10000 Å in thickness on the surface of the alignment film, a half of the region of one picture element was irradiated with light, and developed with a predetermined developing liquid, thereby patterning the photoresist to form a mask covering a half of the picture element. Thereafter, a second rubbing treatment in the direction opposite to the first rubbing direction was conducted, and then the layer of the mask was removed by using a predetermined stripping liquid.

The pair of the substrates thus obtained were assembled into a 90° TN by facing the mask portions thereof to each other, and at the same time facing the second rubbing treatment portions thereof to each other. Then, Np liquid crystal was filled into the space between the pair of the substrates, thereby forming a liquid crystal display cell having an inter-electrode distance of 6 μm. The liquid crystal display cell thus obtained showed an excellent alignment state at the initial state, and at the same time indicated an excellent display which was free from inversion of brightness and darkness according to the difference in viewing angle in the half tone display.

EXAMPLE 18

TFT switch elements were mounted on one of a pair of transparent substrate, and picture element electrodes of 200 μm square and made of a transparent electrode were formed on the wiring in the form of matrix. Further, a supplemental capacity line was formed at the center of the picture element. Meanwhile, on all over the surface of the other one of the substrates was formed a black matrix so as to correspond to the transparent electrode and to the wiring.

Then, a solvent-soluble ring-closure type polyimide having a relative dielectric constant of 4.5 was coated over the surface of each of transparent substrates. Each of the substrates was post-baked at a temperature of 180° C. for one hour, thereby fixing an alignment film comprising polyimide on the surface of the substrate, and then a first rubbing treatment was performed.

After forming a negative photoresist layer (OMR-85, Tokyo Ohka Kogyo Co. Ltd.) 8000 Å in thickness on the surface of the alignment film, a half of the region of one picture element, i.e. a region encircled by a gate line, a signal line and a supplemental capacity line was irradiated with light, and developed with a predetermined developing liquid, thereby patterning the photoresist to form a mask covering a half of the picture element.

Thereafter, a second rubbing treatment in the direction opposite to the first rubbing direction was conducted, and then the layer of the mask was removed by using a predetermined stripping liquid.

The pair of the substrates thus obtained were assembled into a 90° TN by facing the mask portions thereof to each other, and at the same time facing the second rubbing treatment portions thereof to each other. Then, Np liquid crystal was filled into the space between the pair of the substrates, thereby forming a liquid crystal display cell having an inter-electrode distance of 6 μm. The liquid crystal display cell thus obtained showed an excellent alignment state at the initial state, and at the same time indicated an excellent display which was free from inversion of brightness and darkness according to the difference in viewing angle in the half tone display, and also free from a tilt disclination line.

In the following Examples 19 and 20, polyimide having a relative dielectric constant of 4 to 7 in the frequency of 1 kHz at 20° C. was employed as an alignment film material, and a positive photoresist was employed as a masking material.

EXAMPLE 19

The process of Example 17 was repeated except that an acryl positive photoresist (ARC-1, Nihon Gosei Gomu Co. Ltd.) was employed as a masking material, and NMD-3 (0.5% by weight) was used as a developing liquid.

The liquid crystal display cell thus obtained showed an excellent alignment state at the initial state, and at the same time indicated an excellent display which was free from inversion of brightness and darkness according to the difference in viewing angle in the half tone display.

EXAMPLE 20

The process of Example 18 was repeated except that an acryl positive photoresist (ARC-1, Nihon Gosei Gomu Co. Ltd.) was employed as a masking material, and NMD-3 (0.5% by weight) was used as a developing liquid.

The liquid crystal display cell thus obtained showed an excellent alignment state at the initial state, and at the same time indicated an excellent display which was free from inversion of brightness and darkness according to the difference in viewing angle in the half tone display, and also free from a tilt disclination line.

Comparative Example 8

TFT switch elements were mounted on one of a pair of transparent substrate, and a picture element electrodes of 200 μm square and made of a transparent electrode were formed on the line in the form of matrix. Further, a supplemental capacity wiring was formed at the center of the picture element. Meanwhile, on all over the surface of the other one of the substrates was formed a black matrix so as to correspond to the transparent electrode and to the wiring.

Then, a solvent-soluble ring-closure type polyimide having a relative dielectric constant of 7.2 was coated over the surface of each of transparent substrates. Each of the substrates was post-baked at a temperature of 180° C. for one hour, thereby fixing an alignment film comprising polyimide on the surface of the substrate, and then a first rubbing treatment was performed.

After forming a negative photoresist layer (OMR-85, Tokyo Ohka Kogyo Co. Ltd.) 8000 Å in thickness on the surface of the alignment film, a half of the region of one picture element, i.e. a region encircled by a gate line, a signal line and a supplemental capacity line was irradiated with light, and developed with a predetermined developing liquid, thereby patterning the photoresist.

Thereafter, a second rubbing treatment in the direction opposite to the first rubbing direction was conducted, and then the layer of the mask was removed by using a predetermined stripping liquid.

The pair of the substrates thus obtained were assembled into a 90° TN by facing the mask portions thereof to each other, and at the same time facing the second rubbing treatment portions thereof to each other. Then, Np liquid crystal was filled into the space between the pair of the substrates, thereby forming a liquid crystal display cell having an inter-electrode distance of 6 μm. The liquid crystal display cell thus obtained showed an excellent alignment state at the initial state, but a conspicuous deterioration in alignment was admitted after 50 hours of life test at a temperature of 100° C.

Comparative Example 9

A whole aromatic ring-closure type polyimide having a relative dielectric constant of 3.5 was coated over the surface of each of transparent substrates, each being provided in advance with a transparent electrode. Each of the substrates was post-baked at a temperature of 280° C. for one hour, thereby fixing an alignment film comprising polyimide on the surface of the substrate, and then a first rubbing treatment was performed.

After forming a negative photoresist layer (OMR-85, Tokyo Ohka Kogyo Co. Ltd.) 10000 Å in thickness on the surface of the alignment film, a half of the region of one picture element was irradiated with light, and developed with a predetermined developing liquid, thereby patterning the photoresist.

Thereafter, a second rubbing treatment in the direction opposite to the first rubbing direction was conducted, and then the layer of the mask was removed at a temperature of 80° C. by using a predetermined stripping liquid.

The pair of the substrates thus obtained were assembled into a 90° TN by facing the mask portions thereof to each other, and at the same time facing the second rubbing treatment portions thereof to each other. Then, Np liquid crystal was filled into the space between the pair of the substrates, thereby forming a liquid crystal display cell having an inter-electrode distance of 6 μm. The liquid crystal display cell thus obtained showed a clear trace of the pouring flow of liquid crystal at the initial state, due to the influence from the resist-stripping liquid to the alignment film, and at the same time indicated a defective display, thereby making it impossible to partition the picture element into two regions having a different rising direction of the liquid crystal molecule from each other that can be induced by the writing through electric voltage.

In the following Examples 21 to 30, an acryl positive photoresist was used as a masking material.

EXAMPLE 21

A thermal ring-closure type polyimide having a glass transition temperature of 400° C. was coated over the surface of each of transparent substrates, each being provided in advance with a transparent electrode. Each of the substrates was post-baked at a temperature of 280° C. for one hour, thereby fixing an alignment film comprising polyimide on the surface of the substrate, and then a first rubbing treatment was performed.

After forming a layer 10000 Å in thickness of a positive photoresist consisting of a mixture comprising polymethacrylate, onium salt and an acetal compound on the surface of the alignment film, then a half of the region of one picture element was irradiated with light, and finally developed with a predetermined developing liquid, thereby patterning the photoresist to form a mask covering a half of the picture element. Thereafter, a second rubbing treatment in the direction opposite to the first rubbing direction was conducted, and then the layer of the mask was removed by using a predetermined stripping liquid.

The pair of the substrates thus obtained were assembled into a 90° TN by facing the mask portions thereof to each other, and at the same time facing the second rubbing treatment portions thereof to each other. Then, Np liquid crystal was filled into the space between the pair of the substrates, thereby forming a liquid crystal display cell having an inter-electrode distance of 65 m. The liquid crystal display cell thus obtained showed an excellent alignment state at the initial state, and at the same time indicated an excellent display which was free from inversion of brightness and darkness according to the difference in viewing angle in the half tone display.

EXAMPLE 22

TFT switch elements were mounted on one of a pair of transparent substrate, and picture element electrodes of 200 μm square and made of a transparent electrode were formed on the wiring in the form of matrix. Further, a supplemental capacity line was formed at the center of the picture element. Meanwhile, on all over the surface of the other one of the substrates was formed a black matrix so as to correspond to the transparent electrode and to the wiring.

Then, a solvent-soluble ring-closure type polyimide having a glass transition temperature of 380° C. was coated over the surface of each of transparent substrates. Each of the substrates was post-baked at a temperature of 180° C. for one hour, thereby fixing an alignment film comprising polyimide on the surface of the substrate, and then a first rubbing treatment was performed.

After forming a layer 8000 Å in thickness of a positive photoresist comprising polyacrylate, sulfonate and polyphthalaldehyde on the surface of the alignment film, a half of the region of one picture element, i.e. a region encircled by a gate line, a signal line and a supplemental capacity line was irradiated with light, and developed with a predetermined developing liquid, thereby patterning the photoresist to form a mask covering a half of the picture element.

Thereafter, a second rubbing treatment in the direction opposite to the first rubbing direction was conducted, and then the layer of the mask was removed by using a predetermined stripping liquid.

The pair of the substrates thus obtained were assembled into a 90° TN by facing the mask portions thereof to each other, and at the same time facing the second rubbing treatment portions thereof to each other. Then, Np liquid crystal was filled into the space between the pair of the substrates, thereby forming a liquid crystal display cell having an inter-electrode distance of 6 μm. The liquid crystal display cell thus obtained showed an excellent alignment state at the initial state, and at the same time indicated an excellent display which was free from inversion of brightness and darkness according to the difference in viewing angle in the half tone display, and also free from a tilt disclination line.

EXAMPLE 23

A thermal ring-closure type polyimide having a general formula was coated over the surface of each of transparent substrates, each being provided in advance with a transparent electrode. This polyimide employed herein did not contain two-revolution symmetric axis in its skeleton.

Each of the substrates was post-baked at a temperature of 280° C. for one hour, thereby fixing an alignment film comprising polyimide on the surface of the substrate, and then a first rubbing treatment was performed.

After forming a layer 10000 Å in thickness of a positive photoresist consisting of a mixture comprising polymethacrylate, onium salt and an acetal compound on the surface of the alignment film, then a half of the region of one picture element was irradiated with light, and finally developed with a predetermined developing liquid, thereby patterning the photoresist to form a mask covering a half of the picture element.

Thereafter, a second rubbing treatment in the direction opposite to the first rubbing direction was conducted, and then the layer of the mask was removed by using a predetermined stripping liquid. In this manufacturing process, the alignment film was not dissolved into the solvent for the developing liquid, and found after an oblique lighting test as being normal. The pair of the substrates thus obtained were assembled into a 90° TN by facing the mask portions thereof to each other, and at the same time facing the second rubbing treatment portions thereof to each other. Then, Np liquid crystal was filled into the space between the pair of the substrates, thereby forming a liquid crystal display cell having an inter-electrode distance of 6 μm.

The liquid crystal display cell thus obtained showed an excellent alignment state at the initial state, and at the same time indicated an excellent display which was free from inversion of brightness and darkness according to the difference in viewing angle in the half tone display.

EXAMPLE 24

TFT switch elements were mounted on one of a pair of transparent substrate, and picture element electrodes of 200 μm square and made of a transparent electrode were formed on the wiring in the form of matrix. Further, a supplemental capacity line was formed at the center of the picture element. Meanwhile, on all over the surface of the other one of the substrates was formed a black matrix so as to correspond to the transparent electrode and to the wiring.

Then, a solvent-soluble ring-closure type polyimide having the general formula (12) described above was coated over the surface of each of transparent substrates. This polyimide employed herein did not contain two-revolution symmetric axis in its skeleton.

Each of the substrates was post-baked at a temperature of 180° C. for one hour, thereby fixing an alignment film comprising polyimide on the surface of the substrate, and then a first rubbing treatment was performed.

After forming a layer 8000 Å in thickness of a positive photoresist comprising a mixture of polyacrylate, onium salt and fatty ester on the surface of the alignment film, a half of the region of one picture element, i.e. a region encircled by a gate line, a signal line and a supplemental capacity line was irradiated with light, and developed with a predetermined developing liquid, thereby patterning the photoresist to form a mask covering a half of the picture element.

Thereafter, a second rubbing treatment in the direction opposite to the first rubbing direction was conducted, and then the layer of the mask was removed by using a predetermined stripping liquid.

The pair of the substrates thus obtained were assembled into a 90° TN by facing the mask portions thereof to each other, and at the same time facing the second rubbing treatment portions thereof to each other. Then, Np liquid crystal was filled into the space between the pair of the substrates, thereby forming a liquid crystal display cell having an inter-electrode distance of 6 μm. The liquid crystal display cell thus obtained showed an excellent alignment state at the initial state, and at the same time indicated an excellent display which was free from inversion of brightness and darkness according to the difference in viewing angle in the half tone display, and also free from a tilt disclination line.

EXAMPLE 25

The process of Example 24 was repeated except that a solvent-soluble ring closure type polyimide shown in the general formula (13) was used as an alignment film.

The liquid crystal display cell thus obtained showed an excellent alignment state at the initial state, and at the same time indicated an excellent display which was free from inversion of brightness and darkness according to the difference in viewing angle in the half tone display, and also free from a tilt disclination line.

EXAMPLE 26

The process of Example 18 was repeated except that a solvent-soluble ring closure type polyimide shown in the general formula (14) was employed as an alignment film material.

The liquid crystal display cell thus obtained showed an excellent alignment state at the initial state, and at the same time indicated an excellent display which was free from inversion of brightness and darkness according to the difference in viewing angle in the half tone display, and also free from a tilt disclination line.

EXAMPLE 27

A thermal ring-closure type polyimide having nonconjugated carbon in its skeleton, the number of the non-conjugated carbon occupying 13.8% of the total number of carbon excluding those directly connected to imido group was coated over the surface of each of transparent substrates, each being provided in advance with a transparent electrode. Each of the substrates was post-baked at a temperature of 280° C. for one hour, thereby fixing an alignment film comprising polyimide on the surface of the substrate, and then a first rubbing treatment was performed.

After forming a layer 10000 Å in thickness of a positive photoresist comprising a mixture of polymethylmethacrylate, nitrobenzyl ester and methoxymethyl melamine on the surface of the alignment film, a half of the region of one picture element was irradiated with light, and developed with a predetermined developing liquid, thereby patterning the photoresist to form a mask covering a half of the picture element. Thereafter, a second rubbing treatment in the direction opposite to the first rubbing direction was conducted, and then the layer of the mask was removed by using a predetermined stripping liquid (stripper).

The pair of the substrates thus obtained were assembled into a 90° TN by facing the mask portions thereof to each other, and at the same time facing the second rubbing treatment portions thereof to each other. Then, Np liquid crystal was filled into the space between the pair of the substrates, thereby forming a liquid crystal display cell having an inter-electrode distance of 6 µm. The liquid crystal display cell thus obtained showed an excellent alignment state at the initial state, and at the same time indicated an excellent display which was free from inversion of brightness and darkness according to the difference in viewing angle in the half tone display.

EXAMPLE 28

TFT switch elements were formed on one of a pair of transparent substrate, and picture element electrode of 200 µm square and made of a transparent electrode were formed on the wiring in the form of matrix. Further, a supplemental capacity line was formed at the center of the picture element. Meanwhile, on all over the surface of the other one of the substrates was formed a black matrix so as to correspond to the transparent electrode and to the wiring.

Then, a solvent-soluble ring-closure type polyimide having 33.3% in number of non-conjugated carbon was coated over the surface of each of transparent substrates. Each of the substrates was post-baked at a temperature of 180° C. for one hour, thereby fixing an alignment film comprising polyimide on the surface of the substrate, and then a first rubbing treatment was performed.

After forming a layer 8000 Å in thickness of a positive photoresist on the surface of the alignment film, a half of the region of one picture element, i.e. a region encircled by a gate line, a signal line and a supplemental capacity line was irradiated with light, and developed with a predetermined developing liquid (developper), thereby patterning the photoresist to form a mask covering a half of the picture element.

Thereafter, a second rubbing treatment in the direction opposite to the first rubbing direction was conducted, and then the layer of the mask was removed by using a predetermined stripping liquid.

The pair of the substrates thus obtained were assembled into a 90° TN by facing the mask portions thereof to each other, and at the same time facing the second rubbing treatment portions thereof to each other. Then, Np liquid crystal was filled into the space between the pair of the substrates, thereby forming a liquid crystal display cell having an inter-electrode distance of 6 µm. The liquid crystal display cell thus obtained showed an excellent alignment state at the initial state, and at the same time indicated an excellent display which was free from inversion of brightness and darkness according to the difference in viewing angle in the half tone display, and also free from a tilt disclination line.

EXAMPLE 29

A thermal ring-closure type polyimide having a relative dielectric constant of 4 was coated over the surface of each of transparent substrates, each being provided in advance with a transparent electrode. Each of the substrates was post-baked at a temperature of 280° C. for one hour, thereby fixing an alignment film comprising polyimide on the surface of the substrate, and then a first rubbing treatment was performed.

After forming a layer 10000 Å in thickness of a positive photoresist comprising a mixture of an acryl resin, sulfonate and an acetal compound on the surface of the alignment film, a half of the region of one picture element was irradiated with light, and developed with a predetermined developing liquid, thereby patterning the photoresist to form a mask covering a half of the picture element. Thereafter, a second rubbing treatment in the direction opposite to the first rubbing direction was conducted, and then the layer of the mask was removed by using a predetermined stripping liquid.

The pair of the substrates thus obtained were assembled into a 90° TN by facing the mask portions thereof to each other, and at the same time facing the second rubbing treatment portions thereof to each other. Then, Np liquid crystal was filled into the space between the pair of the substrates, thereby forming a liquid crystal display cell having an inter-electrode distance of 6 µm. The liquid crystal display cell thus obtained showed an excellent alignment state at the initial state, and at the same time indicated an excellent display which was free from inversion of brightness and darkness according to the difference in viewing angle in the half tone display.

EXAMPLE 30

TFT switch elements were mounted on one of a pair of transparent substrate, and picture element electrodes of 200 µm square and made of a transparent electrodes were formed on the wiring in the form of matrix. Further, a supplemental capacity line was formed at the center of the picture element. Meanwhile, on all over the surface of the other one of the substrates was formed a black matrix so as to correspond to the transparent electrode and to the wiring.

Then, a solvent-soluble ring-closure type polyimide having a relative dielectric constant of 4.5 was coated over the surface of each of transparent substrates. Each of the substrates was post-baked at a temperature of 180° C. for one hour, thereby fixing an alignment film comprising polyimide on the surface of the substrate, and then a first rubbing treatment was performed.

After forming a negative photoresist layer (OMR-85, Tokyo Ohka Kogyo Co. Ltd.) 8000 Å in thickness on the surface of the alignment film, a half of the region of one picture element, i.e. a region encircled by a gate line, a signal line and a supplemental capacity line was irradiated with light, and developed with a predetermined developing liquid, thereby patterning the photoresist to form a mask covering a half of the picture element.

Thereafter, a second rubbing treatment in the direction opposite to the first rubbing direction was conducted, and then the layer of the mask was removed by using a predetermined stripping liquid.

The pair of the substrates thus obtained were assembled into a 90° TN by facing the mask portions thereof to each other, and at the same time facing the second rubbing treatment portions thereof to each other. Then, Np liquid crystal was filled into the space between the pair of the substrates, thereby forming a liquid crystal display cell having an inter-electrode distance of 6 µm. The liquid crystal display cell thus obtained showed an excellent alignment state at the initial state, and at the same time indicated an excellent display which was free from inversion of brightness and darkness according to the difference in viewing angle in the half tone display, and also free from a tilt disclination line.

In the following Examples 31 and 32, a polyimide having an imidization degree of 90% or less was used as an alignment film material.

EXAMPLE 31

A glass substrate having a transparent common electrode formed thereon, and another glass substrate having a picture element electrode and a TFT driving element formed thereon were prepared. The TFT driving element was connected to an ITO electrode having a picture element size of 110×330 µm. A layer 1000 Å in thickness of a polyimide-precursor solution (a polyamic acid solution, SE-3140, Nissan Kagaku Co. Ltd.) was formed by a printing method on each of the glass substrates. The resultant substrate was sintered in an oven at a temperature of 200° C. for 30 minutes, thereby obtaining an alignment film consisting of a polyimide having an imidization degree of 75%.

To this polyimide alignment film, a first rubbing alignment treatment was performed, and then a positive resist of cresol novolak type (OFPR-800, Tokyo Ohka Kogyo Co. Ltd.) was coated on the film. The layer of the positive resist was exposed to light and developed to form a patterning, thereby obtaining a stripe-shaped mask which was partitioned into a plurality of picture elements alternately neighboring to each other. This development treatment was conducted by immersing the resist in a 3% aqueous solution of tetramethylammonium hydroxide for 3 minutes.

Thereafter, a second rubbing treatment in the direction opposite to the first rubbing direction was conducted, and then the layer of the mask was removed. Subsequently, a pair of the substrates thus obtained were assembled and sealed with a sealing agent in such a manner that each of the aligned portions having the same times of rubbing alignment treatment was disposed face to face with a spacer disposed therebetween, thereby obtaining a liquid crystal cell. To this liquid crystal cell, a liquid crystal composition, ZLI-1132 (E. Merck Co. Ltd.) was filled thereby to obtain a TN type liquid crystal display device.

When this liquid crystal display device was examined on the quality of alignment of the liquid crystal, the realization of uniform alignment of 90° twist was confirmed. Further, when this liquid crystal display device was activated, it was possible to show a uniform display of high quality from every direction.

Although a polyimide having an imidization of 75% was used in this example, it was confirmed upon examining the relationship between the imidization degree and the quality of display that if a polyimide having an imidization degree of not more than 90% is employed, it is possible to obtain a display of excellent quality. The reason for this may be explained as that since the polyamic acid included in the alignment film functions to raise the pretilt angle, it is possible to attain a suitable pretilt angle (2° to 10°) without being affected by the contact thereof with an alkaline developing solution.

EXAMPLE 32

A glass substrate having a transparent common electrode formed thereon, and another glass substrate having picture element electrodes and TFT driving elements formed thereon were prepared. The TFT driving elements were connected to an ITO electrode having a picture element size of 110×330 µm. A layer 900 Å in thickness of a polyimide-precursor solution (a polyamic acid solution, SE-3140, Nissan Kagaku Co. Ltd.) was formed by a printing method on each of the glass substrates. The resultant substrate was sintered in an oven at a temperature of 240° C. for 50 minutes, thereby obtaining an alignment film consisting of a polyimide having an imidization degree of 90%.

To this polyimide alignment film, a first rubbing alignment treatment was performed, and then a positive resist (OFPR-800, Tokyo Ohka Kogyo Co. Ltd.) was coated on the film. The layer of the positive resist was exposed to light and developed to form a patterning, thereby obtaining a stripe-shaped mask which was partitioned into two picture elements.

Thereafter, a second rubbing treatment in the direction opposite to the first rubbing direction was conducted, and then the layer of the mask was removed. Subsequently, a pair of the substrates thus obtained were assembled and sealed with a sealing agent in such a manner that each of the aligned portions having the same times of rubbing alignment treatment was disposed face to face with a spacer disposed therebetween, thereby obtaining a liquid crystal cell. To this liquid crystal cell, a liquid crystal composition, ZLI-1695 (E. Merck Co. Ltd.,Δ=0.0625) was filled thereby to obtain a liquid crystal display device having a thickness d=4.0 µm. Since disclination lines were generated due to the variation in the alignment direction in one picture element, a black matrix was formed in this example at the portions where the disclination lines were generated.

When this liquid crystal display device was examined on the quality of alignment of the liquid crystal, the realization of uniform alignment was confirmed. Further, when this liquid crystal display device was activated to measure the viewing angle-dependency of the contrast, it was possible to obtain a uniform display of high quality from every direction. FIG. 14 shows an equi-contrast curve.

In the following Examples 33 and 34, a mask having a modulus of elasticity in tension of 20 to 500 kgf/mm$^2$ was used.

EXAMPLE 33

TFT switch elements were mounted on one of a pair of transparent substrate, and picture element electrodes of 200 µm square and made of a transparent electrode were formed on the wiring in the form of matrix. Further, a supplemental capacity line was formed at the center of the picture element. Meanwhile, on all over the surface of the other one of the substrates was formed a black matrix so as to correspond to the transparent electrode and to the wiring.

Then, a solvent-soluble ring-closure type polyimide was coated over the surface of each of transparent substrates. Each of the substrates was post-baked at a temperature of 180° C. for one hour, thereby fixing an alignment film comprising polyimide on the surface of the substrate, and then a first rubbing treatment was performed.

After forming a negative photoresist layer (OMR-85, Tokyo Ohka Kogyo Co. Ltd.) 8000 Å in thickness on the surface of the alignment film, a half of the region of one picture element, i.e. a region encircled by a gate line, a signal line and a supplemental capacity line was irradiated with light, and developed with a predetermined developing liquid, thereby patterning the photoresist to form a mask covering a half of the picture element. The modulus of this photoresist mask was 100 kgf/mm$^2$.

Thereafter, a second rubbing treatment in the direction opposite to the first rubbing direction was conducted, and then the layer of the mask was removed by using a predetermined stripping/liquid. In this rubbing process, any of peelings and shavings were not recognized.

The pair of the substrates thus obtained were assembled into a 90° TN by facing the mask portions thereof to each other, and at the same time facing the second rubbing treatment portions thereof to each other. Then, Np liquid crystal was filled into the space between the pair of the substrates, thereby forming a liquid crystal display cell having an inter-electrode distance of 6 μm. The liquid crystal display cell thus obtained showed an excellent alignment state at the initial state, and at the same time indicated an excellent display which was free from inversion of brightness and darkness according to the difference in viewing angle in the half tone display, and also free from a tilt disclination line.

EXAMPLE 34

TFT switch elements were mounted on one of a pair of transparent substrate, and picture element electrodes of 200 μm square and made of a transparent electrode were formed on the wiring in the form of matrix. Further, a supplemental capacity line was formed at the center of the picture element. Meanwhile, on all over the surface of the other one of the substrates was formed a black matrix so as to correspond to the transparent electrode and to the wiring.

Then, a solvent-soluble ring-closure type polyimide (AL-1051, Japan Synthetic Rubber Co. Ltd.) was coated over the surface of each of the transparent substrates. Each of the substrates was post-baked at a temperature of 180° C. for one hour, thereby fixing an alignment film comprising polyimide on the surface of the substrate, and then a first rubbing treatment was performed.

Then, a 4% aqueous solution of polyvinyl alcohol 95% in saponification degree, and 1500 in polymerization degree was coated on the surface of the alignment film, and the resultant coated layer was baked over a hot plate at a temperature of 120° C. for 5 minutes to form a mask layer 6000 Å in thickness. After forming a negative photoresist layer (OMR-85, Tokyo Ohka Kogyo Co. Ltd.) 8000 Å in thickness on the surface of the mask layer, a half of the region of one picture element, i.e. a region encircled by a gate line, a signal line and a supplemental capacity line was irradiated with light, and developed with an alkaline developing liquid (NMD-3, Tokyo Ohka Kogyo Co. Ltd) for 30 seconds, thereby patterning the photoresist.

Then, the mask layer was patterned by immersing the substrate into a hot water of 65° C. for 10 seconds. The photoresist layer was removed by using ethyl Cellosolve acetate, thereby forming a mask covering a half of the picture element. The modulus of elasticity in tension of this PVA mask was 150 kgf/mm$^2$.

Thereafter, a second rubbing treatment in the direction opposite to the first rubbing direction was conducted, and then the layer of the mask was removed by using a predetermined stripping liquid. In this rubbing process, any of peelings and shavings were not recognized.

The pair of the substrates thus obtained were assembled into a 90° TN by facing the mask portions thereof to each other, and at the same time facing the second rubbing treatment portions thereof to each other. Then, Np liquid crystal was filled into the space between the pair of the substrates, thereby forming a liquid crystal display cell having an inter-electrode distance of 6 μm. The liquid crystal display cell thus obtained showed an excellent alignment state at the initial state, and at the same time indicated an excellent display which was free from inversion of brightness and darkness according to the difference in viewing angle in the half tone display, and also free from a tilt disclination line.

Comparative Example 10

A thermal ring-closure type polyimide was coated over the surface of each of transparent substrates, each being provided in advance with a transparent electrode. Each of the substrates was post-baked at a temperature of 280° C. for one hour, thereby fixing an alignment film comprising polyimide on the surface of the substrate, and then a first rubbing treatment was performed.

After forming a positive photoresist layer (OFPR-5000, Tokyo Ohka Kogyo Co. Ltd.) 8000 Å in thickness on the surface of the alignment film, a half of the region of one picture element was irradiated with light, and developed with an alkaline developing liquid (NMD-3, Tokyo Ohka Kogyo Co. Ltd) for 30 seconds, thereby patterning the photoresist. The modulus of this photoresist was found to be 10 kgf/mm$^2$.

Thereafter, a second rubbing treatment in the direction opposite to the first rubbing direction was conducted, and then the layer of the mask was removed by using a predetermined stripping liquid. In this rubbing process, peelings and shavings of the film were recognized.

The pair of the substrates thus obtained were assembled into a 90° TN by facing the mask portions thereof to each other, and at the same time facing the second rubbing treatment portions thereof to each other. Then, Np liquid crystal was filled into the space between the pair of the substrates, thereby forming a liquid crystal display cell having an inter-electrode distance of 6 μm. The liquid crystal display cell thus obtained showed a clear trace of the pouring flow of liquid crystal at the initial state, due to the influence from the resist-stripping liquid to the alignment film, and at the same time indicated a defective display, thereby making it impossible to partition the picture element into two regions having a different rising direction of the liquid crystal molecule from each other that can be induced by the writing through electric voltage.

EXAMPLE 35

A thermal ring-closure type polyimide was coated over the surface of each of transparent substrates, each being provided in advance with a transparent electrode. Each of the substrates was post-baked at a temperature of 280° C. for one hour, thereby fixing an alignment film comprising polyimide on the surface of the substrate, and then a first rubbing treatment was performed.

After forming a positive photoresist layer (OFPR-5000, Tokyo Ohka Kogyo Co. Ltd.) 8000 Å in thickness on the surface of the alignment film, a half of the region of one picture element was irradiated with light, and developed with an alkaline developing liquid (NMD-3, Tokyo Ohka Kogyo Co. Ltd) for 30 seconds, thereby patterning the photoresist, thereby forming a mask covering a half of the picture element. This resist mask was photosensitive to a wavelength corresponding to i beam (365 nm).

Thereafter, a second rubbing treatment in the direction opposite to the first rubbing direction was conducted, and then the layer of the mask was removed by using a predetermined stripping liquid. The pair of the substrates thus obtained were assembled into a 90° TN by facing the mask portions thereof to each other, and at the same time facing the second rubbing treatment portions thereof to each other. Then, Np liquid crystal was filled into the space between the pair of the substrates, thereby forming a liquid crystal display cell having an inter-electrode distance of 6 μm. The liquid crystal display cell thus obtained showed an excellent alignment state at the initial state, and at the same time indicated an excellent display which was free from inversion of brightness and darkness according to the difference in viewing angle in the half tone display.

EXAMPLE 36

TFT switch elements were mounted on one of a pair of transparent substrate, and picture element electrodes of 200 μm square and made of a transparent electrode were formed on the wiring in the form of matrix. Further, a supplemental capacity line was formed at the center of the picture element. Meanwhile, on all over the surface of the other one of the substrates was formed a black matrix so as to correspond to the transparent electrode and to the wiring.

Then, a solvent-soluble ring-closure type polyimide having a glass transition temperature of 380° C. was coated over the surface of each of transparent substrates. Each of the substrates was post-baked at a temperature of 180° C. for one hour, thereby fixing an alignment film comprising polyimide on the surface of the substrate, and then a first rubbing treatment was performed.

After forming a negative photoresist layer (OMR-85, Tokyo Ohka Kogyo Co. Ltd.) 8000 Å in thickness on the surface of the alignment film, a half of the region of one picture element, i.e. a region encircled by a gate line, a signal line and a supplemental capacity line was irradiated with light, and developed with a predetermined developing liquid, thereby patterning the photoresist to form a mask covering a half of the picture element. This resist mask was photosensitive to a wavelength corresponding to i beam.

Thereafter, a second rubbing treatment in the direction opposite to the first rubbing direction was conducted, and then the layer of the mask was removed by using a predetermined stripping liquid. The pair of the substrates thus obtained were assembled into a 90° TN by facing the mask portions thereof to each other, and at the same time facing the second rubbing treatment portions thereof to each other. Then, Np liquid crystal was filled into the space between the pair of the substrates, thereby forming a liquid crystal display cell having an inter-electrode distance of 6 μm. The liquid crystal display cell thus obtained showed an excellent alignment state at the initial state, and at the same time indicated an excellent display which was free from inversion of brightness and darkness according to the difference in viewing angle in the half tone display, and also free from a tilt disclination line.

Comparative Example 11

TFT switch elements were mounted on one of a pair of transparent substrate, and picture element electrodes of 200 μm square and made of a transparent electrode were formed on the wiring in the form of matrix. Further, a supplemental capacity line was formed at the center of the picture element. Meanwhile, on all over the surface of the other one of the substrates was formed a black matrix so as to correspond to the transparent electrode and to the wiring.

Then, a solvent-soluble ring-closure type polyimide was coated over the surface of each of transparent substrates. Each of the substrates was post-baked at a temperature of 180° C. for one hour, thereby fixing an alignment film comprising polyimide on the surface of the substrate, and then a first rubbing treatment was performed.

After forming a positive photoresist layer (polyfluorobutyl methacrylate) 8000 Å in thickness on the surface of the alignment film, a half of the region of one picture element, i.e. a region encircled by a gate line, a signal line and a supplemental capacity line was irradiated with light, and developed with a predetermined developing liquid, thereby patterning the photoresist to form a mask covering a half of the picture element.

Thereafter, a second rubbing treatment in the direction opposite to the first rubbing direction was conducted, and then the layer of the mask was removed by using a predetermined stripping liquid.

The pair of the substrates thus obtained were assembled into a 90° TN by facing the mask portions thereof to each other, and at the same time facing the second rubbing treatment portions thereof to each other. Then, Np liquid crystal was filled into the space between the pair of the substrates, thereby forming a liquid crystal display cell having an inter-electrode distance of 6 μm. The liquid crystal display cell thus obtained failed to show the TN alignment, and was incapable of performing, through induction of electric voltage, a display itself.

Comparative Example 12

A whole aromatic ring-closure type polyimide having a glass transition temperature of 420° C. was coated over the surface of each of transparent substrates, each being provided in advance with a transparent electrode. Each of the substrates was post-baked at a temperature of 280° C. for one hour, thereby fixing an alignment film comprising polyimide on the surface of the substrate, and then a first rubbing treatment was performed.

After forming a positive photoresist layer (EBR-9, Tohre Co. Ltd.) 10000 Å in thickness on the surface of the alignment film, a half of the region of one picture element was irradiated with an electron beam under an accelerated voltage of 20 kv, and developed with a predetermined developing liquid, thereby patterning the photoresist.

Thereafter, a second rubbing treatment in the direction opposite to the first rubbing direction was conducted, and then the layer of the mask was removed at a temperature of 80° C. by using a predetermined stripping liquid.

The pair of the substrates thus obtained were assembled into a 90° TN by facing the mask portions thereof to each other, and at the same time facing the second rubbing treatment portions thereof to each other. Then, Np liquid crystal was filled into the space between the pair of the substrates, thereby forming a liquid crystal display cell having an inter-electrode distance of 6 μm. The liquid crystal display cell thus obtained failed to show the TN alignment, and was incapable of performing, through induction of electric voltage, a display itself.

The following Examples 38 and 39 show examples where a water-soluble polymer was employed as a masking material.

EXAMPLE 37

A thermal ring-closure type polyimide (SE-4140, Nissan Kagaku Co. Ltd.) was coated over the surface of each of transparent substrates, each being provided in advance with a transparent electrode. Each of the substrates was post-baked at a temperature of 280° C. for one hour, thereby fixing an alignment film comprising polyimide on the surface of the substrate, and then a first rubbing treatment was performed. Then, a 4% aqueous solution of polyvinyl alcohol 95% in saponification degree, and 1500 in polymerization degree was coated on the surface of the alignment film, and the resultant coated layer was baked over a hot plate at a temperature of 120° C. for 5 minutes to form a mask layer 4000 Å in thickness.

After forming a positive photoresist layer (OFPR-5000, Tokyo Ohka Kogyo Co. Ltd.) 8000 Å in thickness on the surface of the alignment film, a half of the region of one picture element was irradiated with light, and developed with an alkaline developing liquid (NMD-3, Tokyo Ohka Kogyo Co. Ltd) for 30 seconds, thereby patterning the photoresist. Then, the mask layer was patterned by immersing the substrate into a hot water of 65° C. for 10 seconds. The photoresist layer was removed by using ethyl Cellosolve acetate, thereby forming a mask covering a half of the picture element.

Thereafter, a second rubbing treatment in the direction opposite to the first rubbing direction was conducted, and then the layer of the mask was removed by using a predetermined stripping liquid. The pair of the substrates thus obtained were assembled into a 90° TN facing the mask portions thereof to each other, and the same time facing the second rubbing treatment portions thereof to each other. Then, Np liquid crystal was filled into the space between the pair of the substrates, thereby forming a liquid crystal display cell having an inter-electrode distance of 6 μm. The liquid crystal display cell thus obtained showed an excellent alignment state at the initial state, and at the same time indicated an excellent display which was free from inversion of brightness and darkness according to the difference in viewing angle in the half tone display.

EXAMPLE 38

TFT switch elements were mounted on one of a pair of transparent substrate, and picture element electrodes of 200 μm square and made of a transparent electrode were formed on the wiring in the form of matrix. Further, a supplemental capacity line was formed at the center of the picture element. Meanwhile, on all over the surface of the other one of the substrates was formed a black matrix so as to correspond to the transparent electrode and to the wiring.

Then, a solvent-soluble ring-closure type polyimide (AL-1051, Nihon Gosei Gomu Co. Ltd) was coated over the surface of each of the transparent substrates. Each of the substrates was post-baked at a temperature of 180° C. for one hour, thereby fixing an alignment film comprising polyimide on the surface of the substrate, and then a first rubbing treatment was performed.

Then, a 4% aqueous solution of polyvinyl alcohol 95% in saponification degree, and 1500 in polymerization degree was coated on the surface of the alignment film, and the resultant coated layer was baked over a hot plate at a temperature of 120° C. for 5 minutes to form a mask layer 6000 Å in thickness. After forming a positive photoresist layer (OFPR-5000, Tokyo Ohka Kogyo Co. Ltd.) 8000 Å in thickness on the surface of the mask layer, a half of the region of one picture element, i.e. a region encircled by a gate line, a signal line and a supplemental capacity line was irradiated with light, and developed with an alkaline developing liquid (NMD-3, Tokyo Ohka Kogyo Co. Ltd) for 30 seconds, thereby patterning the photoresist.

Then, the mask layer was patterned by immersing the substrate into a hot water of 65° C. for 10 seconds. The photoresist layer was removed by using ethyl Cellosolve acetate, thereby forming a mask covering a half of the picture element. Thereafter, a second rubbing treatment in the direction opposite to the first rubbing direction was conducted, and then the layer of the mask was removed by using a hot water.

The pair of the substrates thus obtained were assembled into a 90° TN by facing the mask portions thereof to each other, and at the same time facing the second rubbing treatment portions thereof to each other. Then, Np liquid crystal was filled into the space between the pair of the substrates, thereby forming a liquid crystal display cell having an inter-electrode distance of 6 μm. The liquid crystal display cell thus obtained showed an excellent alignment state at the initial state, and at the same time indicated an excellent display which was free from inversion of brightness and darkness according to the difference in viewing angle in the half tone display, and also free from a tilt disclination line.

EXAMPLE 39

TFT switch elements were mounted on one of a pair of transparent substrate, and picture element electrodes of 200 μm square and made of a transparent electrode were formed on the wiring in the form of matrix. Further, a supplemental capacity line was formed at the center of the picture element. Meanwhile, on all over the surface of the other one of the substrates was formed a black matrix so as to correspond to the transparent electrode and to the wiring.

Then, a solvent-soluble ring-closure type polyimide (AL-1051, Nihon Gosei Gomu Co. Ltd) was coated over the surface of each of the transparent substrates. Each of the substrates was post-baked at a temperature of 180° C. for one hour, thereby fixing an alignment film comprising polyimide on the surface of the substrate, and then a first rubbing treatment was performed.

Then, a 4% aqueous solution of polyvinyl alcohol 95% in saponification degree, and 1500 in polymerization degree was coated on the surface of the alignment film, and the resultant coated layer was baked over a hot plate at a temperature of 120° C. for 5 minutes to form a mask layer 8000 Å in thickness. After forming a negative photoresist layer (OMR-85, Tokyo Ohka Kogyo Co. Ltd.) 10000 Å in thickness on the surface of the mask layer, a half of the region of one picture element, i.e. a region encircled by a gate line, a signal line and a supplemental capacity line was irradiated with light, and developed with a predetermined developing liquid, thereby patterning the photoresist.

Then, the PVA layer was patterned by immersing the substrate into a hot water of 65° C. for 10 seconds, thereby forming a mask covering a half of the picture element. Thereafter, a second rubbing treatment in the direction opposite to the first rubbing direction was conducted, and then the layer of the mask was removed by using a hot water of 85° C.

The pair of the substrates thus obtained were assembled into a 90° TN by facing the mask portions thereof to each other, and at the same time facing the second rubbing treatment portions thereof to each other. Then, Np liquid crystal was filled into the space between the pair of the substrates, thereby forming a liquid crystal display cell having an inter-electrode distance of 6 μm. The liquid crystal display cell thus obtained showed an excellent alignment state at the initial state, and at the same time indicated an excellent display which was free from inversion of brightness and darkness according to the difference in viewing angle in the half tone display, and also free from a tilt disclination line.

Comparative Example 13

TFT switch elements were mounted on one of a pair of transparent substrate, and picture element electrodes of 200 μm square and made of a transparent electrode were formed on the wiring in the form of matrix. Further, a supplemental capacity line was formed at the center of the picture element. Meanwhile, on all over the surface of the other one of the substrates was formed a black matrix so as to correspond to the transparent electrode and to the wiring.

Then, a solvent-soluble ring-closure type polyimide (AL-1051, Nihon Gosei Gomu Co. Ltd) was coated over the surface of each of the transparent substrates. The resultant device was post-baked at a temperature of 180° C. for one hour, thereby fixing an alignment film comprising polyimide on the surface of the substrate, and then a first rubbing treatment was performed.

Then, after forming a positive photoresist layer (OFPR-5000, Tokyo Ohka Kogyo Co. Ltd.) 12000 Å in thickness on the surface of the mask layer, a half of the region of one picture element, i.e. a region encircled by a gate line, a signal line and a supplemental capacity line was irradiated with light, and developed with an alkaline developing liquid (NMD-3, Tokyo Ohka Kogyo Co. Ltd.) for 30 seconds, thereby patterning the photoresist. During this the alignment film was completely dissolved by the alkaline developing solution.

Thereafter, a second rubbing treatment in the direction opposite to the first rubbing direction was conducted, and then the layer of the mask was removed.

The pair of the substrates thus obtained were assembled into a 90° TN by facing the mask portions thereof to each other, and at the same time facing the second rubbing treatment portions thereof to each other. Then, Np liquid crystal was filled into the space between the pair of the substrates, thereby forming a liquid crystal display cell having an inter-electrode distance of 6 μm. The liquid crystal display cell thus obtained indicated a defective alignment at the initial state due to the fall out of part of the alignment film, and at the same time was incapable of partitioning the picture element into two regions having a different rising direction of the liquid crystal molecule from each other that can be induced by the writing through electric voltage.

Comparative Example 14

A thermal ring-closure type polyimide (SE-4140, Nissan Kagaku Co. Ltd.) was coated over the surface of each of transparent substrates, each being provided in advance with a transparent electrode. Each of the substrates was post-baked at a temperature of 280° C. for one hour, thereby fixing an alignment film comprising polyimide on the surface of the substrate, and then a first rubbing treatment was performed.

After forming a negative photoresist layer (OMR-85, Tokyo Ohka Kogyo Co. Ltd.) 10000 Å in thickness on the surface of the alignment film, a half of the region of one picture element was irradiated with light, and developed with a predetermined developing liquid, thereby patterning the photoresist.

Thereafter, a second rubbing treatment in the direction opposite to the first rubbing direction was conducted, and then the layer of the mask was removed at a temperature of 80° C. by using a predetermined stripping liquid.

The pair of the substrates thus obtained were assembled into a 90° TN by facing the mask portions thereof to each other, and at the same time facing the second rubbing treatment portions thereof to each other. Then, Np liquid crystal was filled into the space between the pair of the substrates, thereby forming a liquid crystal display cell having an inter-electrode distance of 6 μm. The liquid crystal display cell thus obtained showed a clear trace of the pouring flow of liquid crystal at the initial state, due to the influence from the resist-stripping liquid to the alignment film, and at the same time indicated a defective display, thereby making it impossible to partition the picture element into two regions having a different rising direction of the liquid crystal molecule from each other that can be induced by the writing through electric voltage.

EXAMPLE 40

A glass substrate A having a transparent common electrode formed thereon, and another glass substrate B having picture element electrodes and TFT driving elements formed thereon were prepared. The TFT driving element was connected to an ITO electrode having a picture element size of 110×330 μm. A layer 1000 Å in thickness of AL-1051 (a trade name, Nihon Gohsei Gomu Co. Ltd.) which is a polyimide represented by the general formula (1) and having an imidization degree of 100% was formed by a printing method on each of the glass substrates A and B. To these substrates A and B, a first rubbing alignment treatment was performed in such a manner that the liquid crystal molecules were twisted by 90° on the polyimide alignment film. Subsequently, OMR-83 (a trade name, Tokyo Ohka Kogyo Co. Ltd.), i.e. a negative resist comprising a cyclized rubber added with a bisazido compound was formed on the alignment film of the glass substrates A and B. in such a manner as to form a stripe-shaped mask which was partitioned into a plurality of picture elements alternately neighboring to each other. Thereafter, a second rubbing treatment in the direction opposite to the first rubbing direction was conducted, and then the layer of the negative resist was removed. Subsequently, a pair of the substrates A and B thus obtained were assembled and sealed with a sealing agent in such a manner that each of the aligned portions having the same times of rubbing alignment treatment was disposed face to face with a spacer disposed therebetween, thereby obtaining a liquid crystal cell. To this liquid crystal cell, a liquid crystal composition, ZLI-1132 (a trade name, E. Merck Co. Ltd.) was filled thereby to obtain a liquid crystal display device.

For the stripping of this negative resist, a stripping liquid containing 30% by weight of alkylbenzene sulfonate was employed. Since the alignment film is consisted of a polyimide having an imidization degree of 100%, any deterioration of the surface of the alignment film was not admitted even though an acid solution was used as a stripping liquid.

When this liquid crystal display device was examined on the quality of alignment of the liquid crystal, the realization of uniform alignment of 90° twist was confirmed. Further, when this liquid crystal display device was activated, it was possible to show a uniform display of high quality from every direction.

EXAMPLE 41

A glass substrate A having a transparent common electrode formed thereon, and another glass substrate B having picture element electrode and TFT driving element formed thereon were prepared. The TFT driving element was connected to an ITO electrode having a picture element size of 110×330 μm. A layer 1000 Å in thickness of a polyimide represented having an imidization degree of 92% was formed by coating a polyamic acid solution on each of the glass substrates A and B, and sintering them for one hour at a temperature of 190° C.

To these substrates A and B, a first rubbing alignment treatment was performed in such a manner that the liquid crystal molecules were twisted by 90° on the polyimide alignment film. Subsequently, a negative resist of OMR-83 (a trade name, Tokyo Ohka Kogyo Co. Ltd.) was formed on the alignment film of the glass substrates A and B. in such a manner as to form a stripe-shaped mask which was partitioned into a plurality of picture elements alternately neighboring to each other. Thereafter, a second rubbing treatment in the direction opposite to the first rubbing direction was conducted, and then the layer of the negative resist was removed by using the same stripping liquid as that used in Example 41. Subsequently, a pair of the substrates A and B thus obtained were assembled and sealed with a sealing agent in such a manner that each of the aligned portions having the same times of rubbing alignment treatment was disposed face to face with a spacer disposed therebetween, thereby obtaining a liquid crystal cell. To this liquid crystal cell, a liquid crystal composition, ZLI-1132 (a trade name, E. Merck Co. Ltd.) was filled to form a layer of liquid crystal having a thickness d=4.0 μm, thereby to obtain a liquid crystal display device.

Since disclination lines were generated due to the variation in the alignment direction in one picture element, a black matrix was formed in this example at the portions where the disclination lines were generated.

When this liquid crystal display device was examined on the quality of alignment of the liquid crystal, the realization of uniform alignment of 90° twist was confirmed. Further, when this liquid crystal display device was operated to measure the viewing angle-dependency of the contrast, it was possible to obtain a uniform display of high quality from every direction as clearly seen from the iso-contrast curve shown in FIG. 14, indicating that it is possible to obtain a liquid crystal display device of uniform and high display quality.

Comparative Example 15

A glass substrate A having a transparent common electrode formed thereon, and another glass substrate B having picture element electrodes and TFT driving elements formed thereon were prepared. The TFT driving element was connected to an ITO electrode having a picture element size of 110×330 μm. A layer 1000 Å in thickness of a polyimide having an imidization degree of 88% was formed by coating a polyamic acid solution on each of the glass substrates A and B, and sintering them for 30 minutes at a temperature of 170° C.

Then, a liquid crystal display device was manufactured using the same process and under the same conditions as those of Example 2.

When this liquid crystal display device was examined on the quality of alignment of the liquid crystal, it was found that the surface of the alignment film was eroded by the stripping liquid, thereby causing disturbances of orientation of the liquid crystal. Further, when this liquid crystal display device was operated, there were admitted the deterioration of contrast and the degradation in quality of the display.

EXAMPLE 42

A thermal ring-closure type polyimide represented by the general formula (2) wherein R bonding a pair of imido groups is selected as being cyclobutane radical was coated over the surface of each of transparent substrates, each being provided in advance with a transparent electrode. The resultant device was postbaked at a temperature of 200° C. for one hour, thereby fixing an alignment film comprising polyimide on the surface of the substrate, and then a first rubbing treatment was performed. Then, after forming a negative photoresist layer 10000 Å in thickness on the surface of the film, a half of the region of one picture element was irradiated with light, and developed with a developing liquid thereby forming a mask pattern covering a half of the picture element. In this case, a 0.75% aqueous solution of methylpiperidine (pH:11.5, boiling point:106° C., pKa:10.08) was used.

Thereafter, a second rubbing treatment in the direction opposite to the first rubbing direction was conducted, and then the layer of the mask pattern was removed by using acetic acid-n-butyl (solubility parameter:8.5 cal$^{1/2}$·cm$^{-3/2}$) as a stripping liquid. As a rinsing liquid, ethanol (solubility parameter:8.5 cal$^{1/2}$·cm$^{-3/2}$) was used. The pair of the substrates thus obtained were assembled into a 90° TN by facing the mask portions thereof to each other, and at the same time facing the second rubbing treatment portions thereof to each other. Then, Np liquid crystal was filled into the space between the pair of the substrates, thereby forming a liquid crystal display cell having an inter-electrode distance of 6 μm. The liquid crystal display cell thus obtained showed an excellent alignment state at the initial state, and at the same time indicated an excellent display which was free from inversion of brightness and darkness according to the difference in viewing angle in the half tone display, and also free from a tilt disclination line.

The thermal transformation temperature (heat resistance temperature) of the photoresist used in this example was 150° C., the modulus of elasticity in tension thereof was 2.7 GPa, the modulus of elasticity in flexure thereof was 2.8 GPa, and the Rockwell hardness thereof was M85. There was not admitted problems such as peeling or shaving of the photoresist film.

EXAMPLE 43

TFT switch elements were mounted on one of a pair of transparent substrate, and picture element electrode of 200 μm square and made of a transparent electrode was formed on the wiring in the form of matrix. Further, a supplemental capacity line was formed at the center of the picture element. Meanwhile, on all over the surface of the other one of the substrates was formed a black matrix so as to correspond to the transparent electrode and to the wiring.

Then, a solvent-soluble ring-closure type polyimide (Optmer-AL series, Nihon Gosei Gomu Co. Ltd), which corresponds to a polyimide represented by the general formula (2) wherein R bonding a pair of imido groups is cyclopentane was coated over the surface of each of the transparent substrates. The resultant device was postbaked at a temperature of 180° C. for one hour, thereby fixing an alignment film comprising polyimide on the surface of the substrate, and then a first rubbing treatment was performed.

Then, after forming a positive photoresist layer 8000 Å in thickness on the surface of the film, a half of the region of one picture element, i.e. a region encircled by a gate line, a signal line and a supplemental capacity line was irradiated with light, and developed with a developing liquid thereby forming a mask pattern covering a half of the picture element. In this case, a 0.5% aqueous solution of trimethylamine (pH:11.4, boiling point:3° C., pKa:9.81) was used.

Thereafter, a second rubbing treatment in the direction opposite to the first rubbing direction was conducted, and then the layer of the mask pattern was removed by using cyclohexane (solubility Parameter:8.2 $cal^{1/2} \cdot cm^{-3/2}$) as a stripping liquid. As a rinsing liquid, propanol (solubility Parameter:8.2 $cal^{1/2} \cdot cm^{-3/2}$) was used. The pair of the substrates thus obtained were assembled into a 90° TN by facing the mask portions thereof to each other, and at the same time facing the second rubbing treatment portions thereof to each other. Then, Np liquid crystal was filled into the space between the pair of the substrates, thereby forming a liquid crystal display cell having an inter-electrode distance of 6 μm. The liquid crystal display cell thus obtained showed an excellent alignment state at the initial state, and at the same time indicated an excellent display which was free from inversion of brightness and darkness according to the difference in viewing angle in the half tone display, and also free from a tilt disclination line.

The thermal transformation temperature (heat resistance temperature) of the photoresist used in this example was 140° C., the modulus of elasticity in tension thereof was 2.0 GPa, the modulus of elasticity in flexure thereof was 2.0 GPa, and the Rockwell hardness thereof was M117. There was not admitted problems such as peeling or shaving of the photoresist film.

EXAMPLE 44

TFT switch elements were mounted on one of a pair of transparent substrate, and picture element electrodes of 200 μm square and made of a transparent electrode were formed on the line in the form of matrix. Further, a supplemental capacity wiring was formed at the center of the picture element. Meanwhile, on all over the surface of the other one of the substrates was formed a black matrix so as to correspond to the transparent electrode and to the wiring.

Then, a solvent-soluble ring-closure type polyimide (Optmer-AL series, Nihon Gosei Gomu Co. Ltd), which corresponds to a polyimide represented by the general formula (2) wherein R bonding a pair of imido groups is cyclopentane was coated over the surface of each of the transparent substrates. Each of the substrates was post-baked at a temperature of 180° C. for one hour, thereby fixing an alignment film comprising polyimide on the surface of the substrate, and then a first rubbing treatment was performed.

Then, after forming a positive photoresist layer 8000 Å in thickness on the surface of the film, a half of the region of one picture element, i.e. a region encircled by a gate line, a signal line and a supplemental capacity line was irradiated with light, and developed with a developing liquid thereby forming a mask pattern covering a half of the picture element. In this case, a 0.5% aqueous solution of trimethylamine (pH:11.4, boiling point:3° C., pKa:9.81) was used.

Thereafter, a second rubbing treatment in the direction opposite to the first rubbing direction was conducted, and then the layer of the mask pattern was removed by using cyclohexane (solubility parameter:8.2 $cal^{1/2} \cdot cm^{-3/2}$) as a stripping liquid. As a rinsing liquid, propanol (solubility parameter:8.2 $cal^{1/2} \cdot cm^{-3/2}$) was used. The pair of the substrates thus obtained were assembled into a 90° TN by facing the mask portions thereof to each other, and at the same time facing the second rubbing treatment portions thereof to each other. Then, Np liquid crystal was filled into the space between the pair of the substrates, thereby forming a liquid crystal display cell having an inter-electrode distance of 65 m. The liquid crystal display cell thus obtained showed an excellent alignment state at the initial state, and at the same time indicated an excellent display which was free from inversion of brightness and darkness according to the difference in viewing angle in the half tone display, and also free from a tilt disclination line.

The thermal transformation temperature (heat resistance temperature) of the photoresist used in this example was 140° C., the modulus of elasticity in tension thereof was 2.0 GPa, the modulus of elasticity in flexure thereof was 2.0 GPa, and the Rockwell hardness thereof was M117. Problems such as peeling or shaving of the photoresist film were not admitted.

Comparative Example 16

TFT switch elements were mounted on one of a pair of transparent substrate, and picture element electrodes of 200 μm square and made of a transparent electrode were formed on the wiring in the form of matrix. Further, a supplemental capacity line was formed at the center of the picture element. Meanwhile, on all over the surface of the other one of the substrates was formed a black matrix so as to correspond to the transparent electrode and to the wiring.

Then, a solvent-soluble ring-closure type polyimide, which corresponds to a polyimide represented by the general formula (2) wherein R bonding a pair of imido groups is —CO— was coated over the surface of each of the transparent substrates. The resultant device was post-baked at a temperature of 180° C. for one hour, thereby fixing an alignment film comprising polyimide on the surface of the substrate, and then a first rubbing treatment was performed.

Then, after forming a positive photoresist layer 8000 Å in thickness on the surface of the film, a half of the region of one picture element, i.e. a region encircled by a gate line, a signal line and a supplemental capacity line was irradiated with light, and developed with a developing liquid thereby forming a mask pattern covering a half of the picture element.

Thereafter, a second rubbing treatment in the direction opposite to the first rubbing direction was conducted, and then the layer of the mask pattern was removed by using a stripping liquid. The pair of the substrates thus obtained were assembled into a 90° TN by facing the mask portions thereof to each other, and at the same time facing the second rubbing treatment portions thereof to each other. Then, Np liquid crystal was filled into the space between the pair of the substrates, thereby forming a liquid crystal display cell having an inter-electrode distance of 6 μm. The liquid crystal display cell thus obtained showed an excellent alignment state at the initial state, but a conspicuous deterioration in alignment was admitted after 50 hours of life test at a temperature of 100° C.

Comparative Example 17

TFT switch elements were mounted on one of a pair of transparent substrate, and picture element electrodes of 200 μm square and made of a transparent electrode were formed on the wiring in the form of matrix. Further, a supplemental capacity line was formed at the center of the picture element. Meanwhile, on all over the surface of the other one of the substrates was formed a black matrix so as to correspond to the transparent electrode and to the wiring.

Then, a thermal ring-closure type polyimide, which corresponds to a polyimide represented by the general formula (2) wherein R bonding a pair of imido groups is —$CH_2$— was coated over the surface of each of the transparent substrates. Each of the substrate was postbaked at a temperature of 220° C. for one hour, thereby fixing an alignment film comprising polyimide on the surface of the substrate, and then a first rubbing treatment was performed.

Then, after forming a phenol positive photoresist layer 10000 Å in thickness on the surface of the film, a half of the region of one picture element was irradiated with light, and developed with a developing liquid thereby forming a mask pattern covering a half of the picture element.

Thereafter, a second rubbing treatment in the direction opposite to the first rubbing direction was conducted, and then the layer of the mask pattern was removed by using a stripping liquid at a temperature of 80° C. The pair of the substrates thus obtained were assembled into a 90° TN by facing the mask portions thereof to each other, and at the same time facing the second rubbing treatment portions thereof to each other. Then, Np liquid crystal was filled into the space between the pair of the substrates, thereby forming a liquid crystal display cell having an inter-electrode distance of 6 μm.

The liquid crystal display cell thus obtained showed a clear trace of the pouring flow of liquid crystal at the initial state, due to the influence from the resist-stripping liquid to the alignment film, as well as due to the problem of re-adhering of the shaved dust of the resist, and at the same time indicated a defective display, thereby making it impossible to partition the picture element into two regions having a different rising direction of the liquid crystal molecule from each other that can be induced by the writing through electric voltage.

The thermal transformation temperature (heat resistance temperature) of the photoresist used in this comparative example was 45° C., the modulus of elasticity in tension thereof was 0.4 GPa, the modulus of elasticity in flexure thereof was 0,8 GPa, and the Rockwell hardness thereof was M45. There were admitted problems such as shavings of the photoresist film.

Comparative Example 18

TFT switch elements were mounted on one of a pair of transparent substrate, and picture element electrodes of 200 μm square and made of a transparent electrodes were formed on the wiring in the form of matrix. Further, a supplemental capacity line was formed at the center of the picture element. Meanwhile, on all over the surface of the other one of the substrates was formed a black matrix so as to correspond to the transparent electrode and to the wiring.

Then, a thermal ring-closure type polyimide, which corresponds to a polyimide represented by the general formula (2) wherein R bonding a pair of imido groups is cyclopentane was coated over the surface of each of the transparent substrates. Each of the substrates was post-baked at a temperature of 200° C. for one hour, thereby fixing an alignment film comprising polyimide on the surface of the substrate, and then a first rubbing treatment was performed.

Then, after forming a negative photoresist layer 10000 Å in thickness on the surface of the film, a half of the region of one picture element was irradiated with light, and developed with a developing liquid thereby forming a mask pattern covering a half of the picture element. In this case, a 0.07% aqueous solution of tetramethylammonium hydroxide (pH:11.9, boiling point:200° C. or more, pKa:11.9) was used.

Thereafter, a second rubbing treatment in the direction opposite to the first rubbing direction was conducted, and then the layer of the mask pattern was removed by using acetic acid n-butyl (solubility parameter:8.5 $cal^{1/2} \cdot cm^{-3/2}$) as a stripping liquid.

The pair of the substrates thus obtained were assembled into a 90° TN by facing the mask portions thereof to each other, and at the same time facing the second rubbing treatment portions thereof to each other. Then, Np liquid crystal was filled into the space between the pair of the substrates, thereby forming a liquid crystal display cell having an inter-electrode distance of 6 μm. The liquid crystal display cell thus obtained showed an electric retention ratio of 80% at the portion of alignment film (a region where the rubbing was conducted twice) to which the developing liquid was contacted, indicating a lowering of electric retention property of alignment film, and also the generation of flicker after 100 hours of switch on, indicating a defective display.

Comparative Example 19

TFT switch elements were mounted on one of a pair of transparent substrate, and picture element electrodes of 200 μm square and made of a transparent electrode were formed on the wiring in the form of matrix. Further, a supplemental capacity line was formed at the center of the picture element. Meanwhile, on all over the surface of the other one of the substrates was formed a black matrix so as to correspond to the transparent electrode and to the wiring.

Then, a thermal ring-closure type polyimide, which corresponds to a polyimide represented by the general formula (2) wherein R bonding a pair of imido groups is cyclopentane was coated over the surface of each of the transparent substrates. Each of the substrates was post-baked at a temperature of 200° C. for one hour, thereby fixing an alignment film comprising polyimide on the surface of the substrate, and then a first rubbing treatment was performed.

Then, after forming a negative photoresist layer 10000 Å in thickness on the surface of the film, a half of the region of one picture element was irradiated with light, and developed with a developing liquid thereby forming a mask pattern covering a half of the picture element. In this case, a 1.5% aqueous solution of dimethylethanol amine (pH:13, boiling point:134° C.) was used.

Thereafter, a second rubbing treatment in the direction opposite to the first rubbing direction was conducted, and then the layer of the mask pattern was removed by using acetic acid n-butyl (solubility parameter:8.5 $cal^{1/2} \cdot cm^{-3/2}$) as a stripping liquid. As a rinsing liquid, ethanol (solubility parameter:12.7 $cal^{1/2} \cdot cm^{-3/2}$) was used.

The pair of the substrates thus obtained were assembled into a 90° TN by facing the mask portions thereof to each other, and at the same time facing the second rubbing treatment portions thereof to each other. Then, Np liquid crystal was filled into the space between the pair of the substrates, thereby forming a liquid crystal display cell having an inter-electrode distance of 6 μm. The liquid crystal display cell thus obtained showed an electric retention ratio of 85% at the portion of alignment film (a region where the rubbing was conducted twice) to which the developing liquid was contacted, indicating a lowering of electric retention property of alignment film, and also the generation of flicker after 500 hours of switch on, indicating a defective display.

Comparative Example 20

TFT switch elements were mounted on one of a pair of transparent substrate, and picture element electrodes of 200 μm square and made of a transparent electrode were formed on the wiring in the form of matrix. Further, a supplemental capacity line was formed at the center of the picture element. Meanwhile, on all over the surface of the other one of the substrates was formed a black matrix so as to correspond to the transparent electrode and to the wiring.

Then, a thermal ring-closure type polyimide, which corresponds to a polyimide represented by the general formula (2) wherein R bonding a pair of imido groups is cyclopentane was coated over the surface of each of the transparent substrates. Each of the substrates was post-baked at a temperature of 200° C. for one hour, thereby fixing an alignment film comprising polyimide on the surface of the substrate, and then a first rubbing treatment was performed.

Then, after forming a negative photoresist layer 10000 Å in thickness on the surface of the film, a half of the region of one picture element was irradiated with light, and developed with a developing liquid thereby forming a mask pattern covering a half of the picture element.

Thereafter, a second rubbing treatment in the direction opposite to the first rubbing direction was conducted, and then the layer of the mask pattern was removed by using ethylene glycolmonoethyl acetate (solubility parameter:8.7 $cal^{1/2} \cdot cm^{-3/2}$) as a stripping liquid. As a rinsing liquid for the stripping liquid, acetone was used.

The pair of the substrates thus obtained were assembled into a 90° TN by facing the mask portions thereof to each other, and at the same time facing the second rubbing treatment portions thereof to each other. Then, Np liquid crystal was filled into the space between the pair of the substrates, thereby forming a liquid crystal display cell having an inter-electrode distance of 6 μm. The liquid crystal display cell thus obtained was low in pretilt angle, causing an edge reverse, and poor in contrast.

As explained above, it has become possible to obtain a liquid crystal display device which is wide in effective visible angle and excellent in display quality.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A liquid crystal display device comprising:

a pair of substrates arranged face to face with each other, each having an alignment film, the alignment films facing each other; and a liquid crystal composition filled in the space between the substrates, wherein each alignment film has a plurality of alignment regions within a display region, one of said alignment regions imparting a first alignment or rise direction to liquid crystal molecules, another one of said alignment regions imparting a second alignment or rise direction to liquid crystal molecules, said first alignment or rise direction being different from said second alignment or rise direction, and a difference in viewing angle within a planar direction being mutually compensated, and at least one of the alignment films comprises a polyimide having an imidization degree of not less than 90%.

2. The liquid crystal display device according to claim 1, wherein said polyimide has an imidization degree of not less than 95%.

\* \* \* \* \*